United States Patent
Kumar et al.

(10) Patent No.: US 12,062,119 B2
(45) Date of Patent: Aug. 13, 2024

(54) DYNAMIC DIFFERENTIAL EVOLUTION BASED CONTROL FOR TYPEFACE VISUAL ACCESSIBILITY

(71) Applicant: ADOBE INC., San Jose, CA (US)

(72) Inventors: Pranay Kumar, Noida (IN); Nipun Jindal, Delhi (IN)

(73) Assignee: Adobe Inc., San Jose, CA (US)

( * ) Notice: Subject to any disclaimer, the term of this patent is extended or adjusted under 35 U.S.C. 154(b) by 130 days.

(21) Appl. No.: 17/851,929

(22) Filed: Jun. 28, 2022

(65) Prior Publication Data
US 2023/0419568 A1 Dec. 28, 2023

(51) Int. Cl.
*G06T 11/20* (2006.01)
*G06F 3/0482* (2013.01)
*G06F 3/04847* (2022.01)

(52) U.S. Cl.
CPC .......... *G06T 11/203* (2013.01); *G06F 3/0482* (2013.01); *G06F 3/04847* (2013.01); *G06T 2200/24* (2013.01)

(58) Field of Classification Search
CPC . G06T 11/203; G06T 2200/24; G06F 3/0482; G06F 3/0487
See application file for complete search history.

(56) References Cited

U.S. PATENT DOCUMENTS

| | | | | |
|---|---|---|---|---|
| 8,553,032 | B1* | 10/2013 | Poston | G06T 11/40 |
| | | | | 345/423 |
| 2012/0092344 | A1* | 4/2012 | Cheng | G06T 11/203 |
| | | | | 715/764 |
| 2017/0301115 | A1* | 10/2017 | Le Henaff | G06T 11/203 |
| 2018/0253883 | A1* | 9/2018 | Shanbhag | G06F 40/109 |
| 2019/0108159 | A1* | 4/2019 | Donahue | G06N 3/08 |
| 2019/0197087 | A1* | 6/2019 | Betts | G06T 11/203 |
| 2021/0090308 | A1* | 3/2021 | Kumawat | G06T 3/18 |
| 2021/0124869 | A1* | 4/2021 | Agarwal | G06F 40/109 |
| 2021/0278958 | A1* | 9/2021 | Dubey | G06F 3/0481 |

OTHER PUBLICATIONS

Boucher et al. ("Bad Characters: Imperceptible NLP Attacks", IEEE, Dec. 11, 2021 (Year: 2021).*
Unknown, "International Dyslexia Association. Frequently Asked Questions About Dyslexia," http://www.interdys.org/, 2011, pp. 1-3.

(Continued)

*Primary Examiner* — Sing-Wai Wu
*Assistant Examiner* — Khoa Vu
(74) *Attorney, Agent, or Firm* — Shook, Hardy & Bacon L.L.P.

(57) ABSTRACT

Embodiments presented in this disclosure provide for dynamic application of user selected visual accessibility transforms onto glyphs of standard fonts so that, for instance, a user device can present textual content to a user in a form personalized by the user to be more readable. In accordance with some aspects, a user selection of a font transformation is received. A set of initial control points of an initial glyph is transposed based on the font transformation to generate a set of modified control points. A modified glyph is constructed using differential evolution based at least on the set of initial control points and the set of modified control points.

19 Claims, 16 Drawing Sheets

(56) References Cited

OTHER PUBLICATIONS

Unknown, Adobe readability initiative, https://www.adobe.com/corporate-responsibility/readability.html, at least as early as Feb. 5, 2022, pp. 1-10.
Gupta, Manisha, "Why is color accessibility important?" https://blog.adobe.com/en/publish/2021/05/20/why-is-color-accessibility-important.html, May 20, 2021, pp. 1-14.
Unknown, "Web Content Accessibility Guidelines (WCAG) 2.1, W3C Recommendation" https://www.w3.org/TR/WCAG21/, , Jun. 5, 2018, pp. 1-83.
Gregor, P et al., "An empirical investigation of ways in which some of the problems encountered by some dyslexics may be alleviated using computer techniques." .In Proc. ASSETS'00, Assets 2000, pp. 85{91, New York, NY, USA, 2000. ACM, pp. 85-91.
Rello, L. et al., "Layout guidelines for web text and a web service to improve accessibility for dyslexics" In Proc. W4A 12, Lyon, France, 2012. ACM Press, pp. 1-9.
Rello, L. et al., "Good Fonts for Dyslexia," Assets 2013 Bellevue, Washington, USA, http://dyslexiahelp.umich.edu/sites/default/files/good_fonts_for_dyslexia_study.pdf, Oct. 2013, pp. 1-8.
Zaman, M.A. et al., "Modified Bezier curves with shape-preserving characteristics using Differential Evolution Optimization Algorithm," Advances in Numerical Analysis, vol. 2013, Article ID 858279, 2013, pp. 1-9.
Unknown, "Understanding typography," https://material.io/design/typography/understanding-typography.html, at east as early as Feb. 5, 2022, pp. 1-20.
Unknown, "About OpenDyslexic font," https://opendyslexic.org/about, at least as early as Feb. 5, 2022, pp. 1-2.

* cited by examiner

DYNAMIC DIFFERENTIAL EVOLUTION BASED CONTROL FOR TYPEFACE VISUAL ACCESSIBILITY

BACKGROUND

Today, a substantial amount of the information conveyed over digital platforms is in the form of text. Visual accessibility is therefore becoming an increasing consideration in displaying textual information on digital devices, not only for users having learning or neurological disabilities, but also for users without specific diagnosed conditions. Typology has a significant impact on the look and feel of textual content, but can also be a tool that facilitates visual accessibility and readability. Some users may have varying degrees of dyslexia or other condition that presents challenges to reading, where the features of the typeface used to present the text can help overcome those challenges. Other users can be interested in text having attributes that reduce eye fatigue or increase their reading speed, or for other personal reasons not necessarily connected with a condition.

SUMMARY

The present disclosure is directed, in part, to dynamic differential evolution based control for typeface visual accessibility, substantially as shown and/or described in connection with at least one of the figures, and as set forth more completely in the claims.

Embodiments presented in this disclosure provide for, among other things, dynamic application of user-selected visual accessibility transforms onto glyphs of standard fonts (such as OpenType, TrueType or other vector based fonts, for example) so that a user device can present textual content to a user in a form personalized by the user to be more readable. The technology is not tied to any specific standard typeface or visual accessibility transform, and application of visual accessibility transforms can be dynamically controlled in real time by a user as the user reads a document. In some embodiments, modifications to initial glyph control points to obtain modified glyph control points are performed per an algorithm specific to a visual accessibility transform selected by the user. Differential evolution (DE) based curve fitting is applied to generate outlines from the modified control points. In some embodiments, the DE curve fitting is performed using a font metadata derived loss function. The font metadata derived loss function incorporates data for both the initial glyph control points and the modified glyph control points so that the resulting modified glyph presented to the user after DE curve fitting is an optimal blend of the visual characteristics of the selected visual accessibility transform with the curves that visually define the style of the initial font.

In embodiments, visual accessibility transforms are applied at the user device with the user actively viewing content and adjusting the transforms to improve readability for the current reading conditions. Further, visual accessibility attributes selected by the user can be embedded as metadata into the document, or stored as global application preferences. In some embodiments, a user device readily reapplies the selected visual accessibility attributes the next time the document is opened based on the metadata.

BRIEF DESCRIPTION OF THE DRAWINGS

The embodiments presented in this disclosure are described in detail below with reference to the attached drawing figures, wherein.

DETAILED DESCRIPTION

Figure 1:
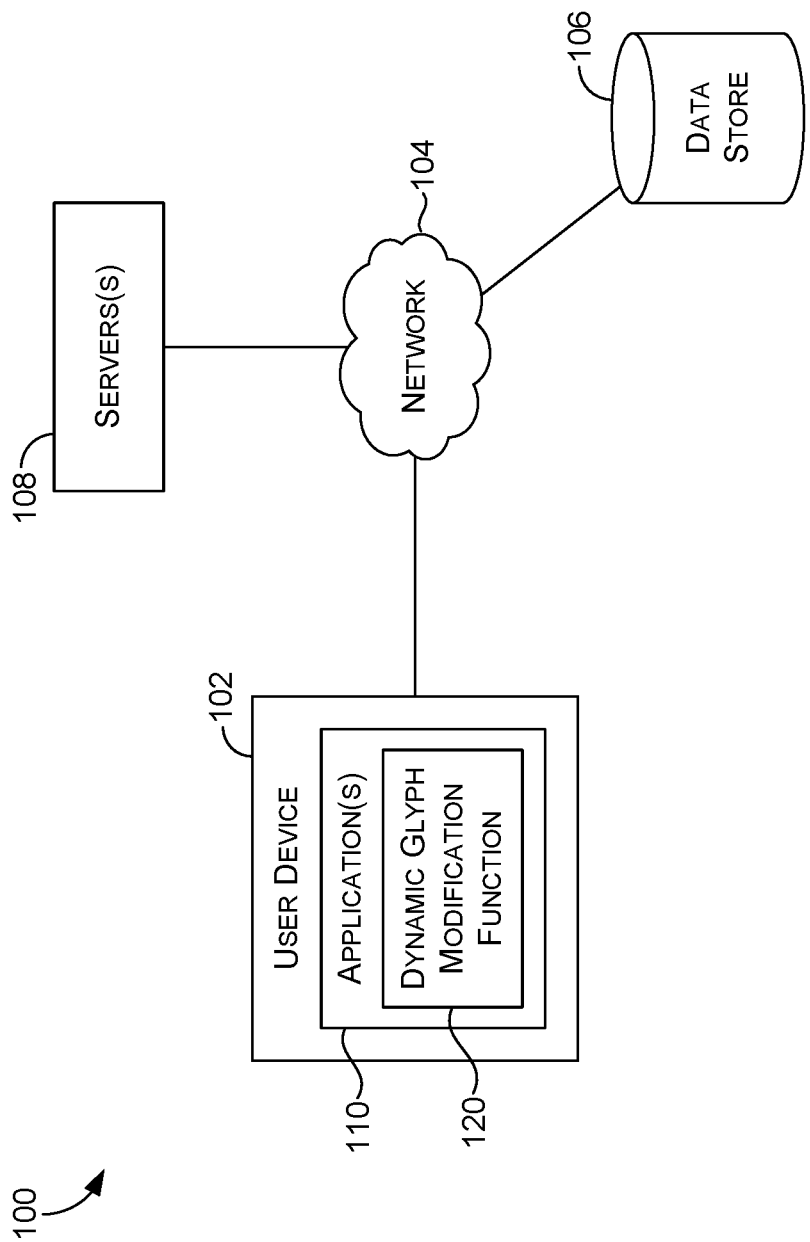
FIG. 1 is a block diagram illustrating an operating environment, in accordance with embodiments of the present disclosure.

The typology used to display textual informal on digital devices has a significant impact on the look and feel of the content, but also affects the effectiveness of the device in conveying information with respect to visual accessibility and readability. Of the many thousands of fonts a user can pick from to display textual content, only a small handful are designed with visual accessibility in mind. For example, dyslexia friendly font sets are available, such as OpenDyslxic and Dyslexie. However, such solutions display text in the same way to every user without taking into account the user's unique accessibility needs, and provide no means for personalization or customization to tailor the reading experience to a user's preferences. For example, a user can have only a mild form of dyslexia or other condition, and not need the full set of accessibility attributes found in dyslexia friendly font sets. Other users can be interested in text having visual accessibility attributes that reduce eye fatigue or increase their reading speed, or for other personal reasons not necessarily connected with a condition. Personalized fonts can be created to meet an individual user's preferences by importing standard fonts into vector editing tools and individually manipulating font control points, but the average user does not have the expertise or tools to go through such a process. Moreover, the process of editing each glyph of the font set would be extremely tedious and can require multiple iterations of trial-and-error to arrive at a set of personalized fonts having desired visual accessibility attributes. Such multiple trial-and-error iterations unnecessarily consume computing resources as each glyph is modified, which is further multiplied by the number of glyphs in the font set being modified.

Other tools are available to graphic designers for performing limited modifications to font outlines (such as horizontal and vertical weight) for aesthetic purposes, but those tools do not facilitate individual end-user personalization or facilitate modifications to complex glyph structures in ways that improve visual accessibility. Since such tools are not designed to render text that is more visually accessible, the device itself remains less effective at providing content to users, consuming power and computing resources to display—for extended durations of time-content that needs to be read more slowly, or re-read multiple times, for the user to understand the words being displayed.

Embodiments of the present disclosure address, among other things, the problems associated with visual accessibility of textual information displayed by digital devices. With these embodiments, an application presenting text can apply unique user-controlled transformations of varying degrees to any vector-domain based typeface, ensuring that the information as displayed has the attributes to meet the user's visually accessibility needs, and thus more effectively convey information to the user. In some embodiments, the solution described herein is implemented by an application executed on a user device such as, but not limited to a document reader, web browser, word processor, email reader, photo editor, illustrator, page designer, or any other application that presents text using vector-based fonts (such as Adobe® Type 1, OpenType, TrueType, or other font technology that uses lines and curves to define the boundary of glyphs, for example).

In accordance with embodiments described herein, a user of the application can select from one or more visual accessibility transformations and apply that transformation to the native font of the document the user is reading to impart visual accessibility attributes on the glyphs of the native font. More specifically, the application generates a modified glyph for each glyph of the native font that is modified based on the visual accessibility transformation(s) selected by the user. Each visual accessibility transformation defines a specific type of modification to the structure of a glyph that assists a user with consuming the textual content. Example visual accessibility transformation include, but are not limited to, glyph bottom part manipulations, glyph stem inclination modifications, glyph stem length modifications, glyph counter modifications, and similar modifications. For example, with respect to glyph bottom part manipulations, glyphs that have heavy weighted bottoms are useful to indicate direction and gravity. Adjustments to glyph stem inclination and stem length help in identifying characters such as letters and numbers apart from one other. Glyph counter modifications refers to adjustments to the weight or volume of enclosed or partially enclosed negative space portions of the glyph and assist in identifying characters. Depending on the user, the application of some visual accessibility transformations facilitate consuming textual content to a greater or lesser degree than other visual accessibility transformations.

In some embodiments, the application displays a user interface on the device display that provides the user with options to select different visual accessibility transformation(s) and/or a control interface (such as a slider, for example) with which the user can indicate a degree of manipulation to be applied by the selected visual accessibility transformation(s). Based on such user selections, modified glyphs are generated and displayed in place of the original glyphs presented in the document. In some embodiments, the selected visual accessibility transformation(s) and/or user provided degree of manipulation can be saved as embedded metadata with the document, so that each time the document is opened by the application, it is displayed using the modified glyphs. In some embodiments, the selected visual accessibility transformation(s) and/or user provided degree of manipulation can be saved by the application as a global preference setting and applied to any documents opened by the application. In some embodiments, the application can store a plurality of user-specified visual accessibility transformation configurations as global preferences from which the user can select a desired configuration. For example, the user can create a personalized visual accessibility transformation configuration they can select for use in an indoor environment, and another personalized visual accessibility transformation configuration they can select for use outdoors.

In embodiments, the application comprises a control points transponder module that receives, for an initial glyph, glyph outline data comprising a set of initial control points. The control points transponder module transposes the initial glyph based on the user-selected visual accessibility font transformation(s) to generate a set of modified control points. Depending on the selected visual accessibility transformation, sets of coefficients and/or helper arguments specific to the selected visual accessibility transformation are passed to the control points transponder module and used to compute the set of modified control points. In some embodiments, the user provided degree of manipulation is also passed to the control points transponder module, essentially functioning as a gain control that the control points transponder module uses to determine how much of a transformation is applied to each initial control point to compute the modified control point. The control points transponder module then constructs an intermediary glyph by computing a set of conciliator outlines based on the set of modified control points. For example, as explained herein, glyph outlines are produced by applying Bezier curve parametric equations to the "n" control points that define the glyph. The set of conciliator outlines, in some embodiments, comprise glyph outlines produced by applying Bezier curve parametric equations to the modified control points computed by the control points transponder module.

While the structure of this intermediary glyph will include the desired visual accessibility attributes associated with the selected visual accessibility transformation(s), it may have lost one or more distinctive characteristics of the typeface of the initial glyph. In order to preserve defining characteristics of the initial glyph in the modified glyph, a curve fitting based on an optimal loss function (which can also be referred to as an error function or a cost function) derived in part from the original control points is applied to the intermediary glyph. More specifically, the application comprises a curve fitting module that generates a font metadata loss function based on the set of initial control points and the set of modified control points, and constructs a modified glyph by curve fitting the intermediary glyph using differential evolution to minimize the font metadata loss function. In some embodiments, further post-processing of the modified glyph can be applied by the application to optionally apply smoothening and/or collision handling. The modified glyph is saved to a cache and associated with the initial glyph so that for each instance where the document includes the initial glyph, the application will display the modified glyph in place of the initial glyph. In some embodiments, a set of modified glyphs is cached as a modified glyph array comprising each of the modified glyphs computed by the application.

Advantageously, embodiments presented herein improve computing resource utilization. For example, saving visual accessibility transformation setting as document metadata rather than copies of the modified glyphs conserves memory storage resources. Moreover, the dynamic glyph modification function is structure as a pipeline that can be universally applied on the user device to implement any visual accessibility transformation defined by control point modifications. Once the modified control points are computed, the subsequent process of constructing an intermediary glyph, generating a font metadata loss function, and constructing a modified glyph by curve fitting the intermediary glyph using differential evolution to minimize the font metadata loss function, remains the same, establishing a flexible technical solution (e.g., on the user device) that increases readability of text based on a user's particular visual accessibility needs. The user device is improved with respect to its ability to effectively communicating information as it is further able to dynamically adjust the presentation of glyph shapes based on user control to address factors such as, but not limited to, lighting conditions, glair, and user eye fatigue.

Turning to FIG. 1, FIG. 1 depicts an example configuration of an operating environment 100 in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities are be carried out by hardware, firmware, and/or software. For instance, in some embodiments, some functions are carried out by a processor executing instructions stored in memory as further described with reference to FIG. 11, or within a cloud computing environment as further described with respect to FIG. 12.

It should be understood that operating environment 100 shown in FIG. 1 is an example of one suitable operating environment. Among other components not shown, operating environment 100 includes a user device, such as user device 102, network 104, a data store 106, and one or more servers 108. Each of the components shown in FIG. 1 can be implemented via any type of computing device, such as one or more of computing device 1100 described in connection to FIG. 11, or within a cloud computing environment 1200 as further described with respect to FIG. 12, for example. These components communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) to provide wireless connectivity. Networking environments are commonplace in offices, enterprise-wide computer networks, intranets, and the Internet. Accordingly, network 104 is not described in significant detail.

It should be understood that any number of user devices, servers, and other components are employed within operating environment 100 within the scope of the present disclosure. Each component comprises a single device or multiple devices cooperating in a distributed environment.

User device 102 can be any type of computing device capable of being operated by a user. For example, in some implementations, user device 102 is the type of computing device described in relation to FIG. 11. By way of example and not limitation, a user device is embodied as a personal computer (PC), a laptop computer, a mobile device, a smartphone, a tablet computer, a smart watch, a wearable computer, a headset, an augmented reality device, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media includes computer-readable instructions executable by the one or more processors. The instructions are embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application 110 can generally be any application capable of facilitating the dynamic glyph modification techniques described herein, either on its own, or via an exchange of information between the user device 102 and the server 108. In some implementations, the application 110 comprises a web application, which can run in a web browser, and could be hosted at least partially on the server-side of environment 100. In addition, or instead, the application 110 can comprise a dedicated application, such as any application having document display functionality. For example application 110 can comprise a document reader application, such as Adobe® Reader or Adobe® Acrobat, an email program, a web browser for reading documents and/or pages served from a web server, or comprise a document editing or content creation application such as a word processor, page layout application, image editing application, or any application that similarly presents textual information on a display of the user device 102 using vector-based fonts (such as Adobe® Type 1, OpenType, TrueType, or other font technology that uses lines and curves to define the boundary of glyphs, for example). In some cases, the application 110 is integrated into the operating system (e.g., as a service). It is therefore contemplated herein that "application" be interpreted broadly.

In some embodiments, the document presented to the user via the display of the user device 102 can be obtained from a memory of the user device 102, or can be obtained from other sources. For example, in some embodiments the document is obtained from a memory of the user device 102, received from a data store 106, or obtained from server 108.

The application 110 operates in conjunction with a dynamic glyph modification function 120. The dynamic glyph modification function 120 processes glyphs initially specified by the document presented by application 110 to display modified glyphs in place of the original glyphs, based on one or more user-selected visual accessibility transformations. In some embodiments, the initial glyphs specified by the document comprises embedded fonts where the metadata for rending the initial glyphs are included in the document. In other embodiments, the initial glyphs specified by the document refer to font files installed on the user device 102 for rendering the initial glyphs included in the document. In either case, the application 110 generates and displays modified glyphs generated by the dynamic glyph modification function 120 based on the user selected visual accessibility transformation(s). The functionality of the user device 102 is therefore enhanced in that it is able transform content created using a standard font into content presented with visual accessibility attributes more readily consumable to the individual user.

In some embodiments, once modified glyphs are generated, they are cached (or otherwise saved) to a memory of the user device 102, for example, into a modified glyph array comprising a plurality of modified glyphs computed by the dynamic glyph modification function 120. As the application 110 displays the document to the user, the application 110 displays the document using the cached modified glyphs in place of their respective corresponding initial glyphs from which they were created. This replacement of modified glyphs for initial glyphs occurs in real time with no noticeable delay to the user. Moreover, the user can interact with a control interface presented on the user device 102 by the application 110 to adjust a degree of manipulation for the visual accessibility transformation, and/or select other visual accessibility transformations. The dynamic glyph modification function 120 computes the updated modified glyphs according to the user provided adjustments, and caches the updated modified glyphs for use by the application 110. The application 110 dynamically updates the display of the document using the updated modified glyphs in real time as the user enters the adjustments. In some embodiments, one or more aspects of the application 110 and/or dynamic glyph modification function 120 are executed at least in part by server(s) 108.

In some embodiments, the selection of visual accessibility transformation(s) and/or user-provided degree of manipulation specified by the user is optionally saved by the application 110 as visual accessibility preference metadata in a document so that the visual accessibility transformation(s) can be immediately applied the next time the user opens the document. For example, in one embodiment when the application 110 opens the document, the visual accessibility preference metadata is read from the document and the dynamic glyph modification function 120 generates the modified glyphs into a modified glyph array comprising each of the modified glyphs. The application 110 displays the newly opened document using the cached modified glyphs in place of their respective corresponding initial glyphs. By saving the visual accessibility preference metadata in the document rather than copies of the modified glyphs themselves, the file size of the document is not substantially increased. Moreover, the document remains compatible with applications that do not comprise a dynamic glyph modification function 120 since those applications simply ignore the visual accessibility preference metadata and present the document using the initial glyphs specified by the document. In some embodiments, the selected visual accessibility transformation(s) and/or user-provided degree of manipulation(s) can be saved by the application 110 as a global preference setting(s) and applied to each documents opened by the application 110. Again, the global preference setting(s) comprise an indication of the user-selected visual accessibility transformation(s) and/or indicated degree of manipulation, and generate the modified glyphs when the document is opened, eliminating the need to store the modified glyph array for use in future documents.

The application 110, in some embodiments, also provides an interactive display on the user device 102 that allows the user to select and adjust visual accessibility transformation(s) and immediately view the results so that they can fine tune the visual accessibility transformation(s) to their current reading environment or conditions. Such a user interface is discussed below in more detail with respect to FIGS. 9A and 9B.

Figure 2:
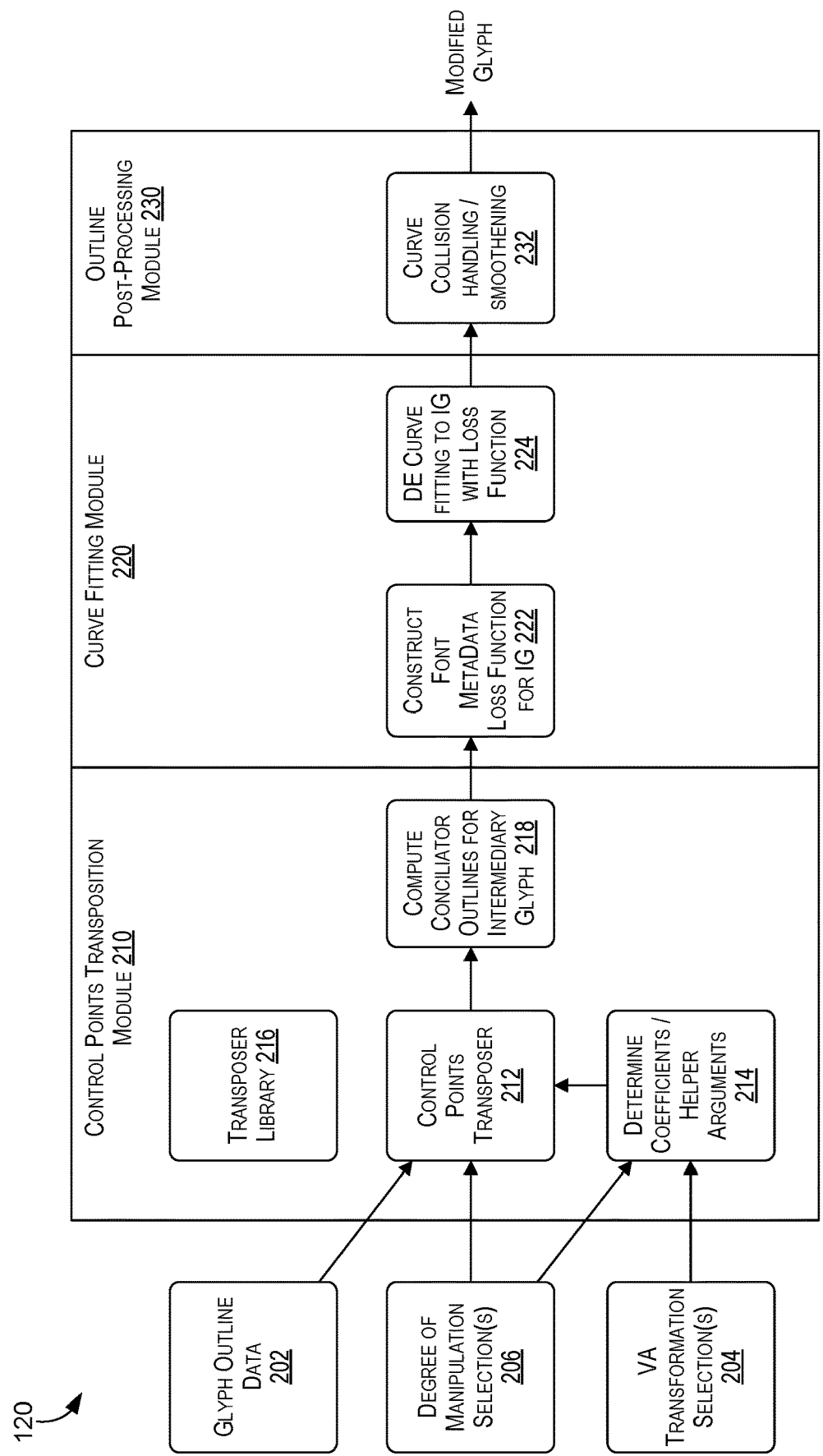
FIG. 2 is a block diagram illustrating an example dynamic glyph modification function, in accordance with embodiments of the present disclosure.

FIG. 2 is a diagram illustrating an example of a dynamic glyph modification function 120, for example, as embodied in application 110. In this embodiment, the dynamic glyph modification function 120 comprises a control point transposition module 210, a curve fitting module 220, and an outline post-processing module 230, each of which can be implemented by algorithms to realize the functionality described herein.

As shown in FIG. 2, in one embodiment, the information received by dynamic glyph modification function 120 comprises glyph outline data 202 for the initial glyph, one or more visual accessibility transformation selections 204 and/or one or more degree of manipulation selections 206 corresponding to the visual accessibility transformation selections 204. In some embodiments, the selection of a non-zero value for a degree of manipulation selection(s) 206 serves as an indication of a visual accessibility transformation selection 204.

The glyph outline data 202 comprises the font metadata for an initial glyph, including the initial control points for constructing the initial glyph. For example, glyph outlines comprise one or more Bezier curves, where those Bezier curves are defined by the initial control points provided by the font metadata. In general for a given Bezier curve, the curve order equals the number of points minus one. For example, two points define a linear curve (a straight line), three points define a quadratic (or parabolic) curve, four points define a cubic curve. By combining curves and straight lines, complex glyphs are constructed, such as used to define the stylized letters and numbers of different typefaces. For a set of (n+1) control points $(x_i, y_i)$, where, i=0, 1, . . . , n the parametric equations of the Bezier curve are given by $$x(u) = \sum_{i=0}^{n} \binom{n}{i}(1-u)^{n-i} u^i x_i$$

and $$y(u) = \sum_{i=0}^{n} \binom{n}{i}(1-u)^{n-i} u^i y_i$$

The control point transposition module 210 receives the glyph outline data 202, the visual accessibility transformation selection(s) 204, and the degree of manipulation selection(s) 206, and executes a control points transposer 212 to compute a modified control point for at least a portion of (e.g., one or more) of the initial control points from the glyph outline data 202. In some embodiments, the control points transposer 212 computes delta adjustment arrays from the initial control points for each outline in the initial glyph. As a glyph often comprises many complex outlines, at least a portion of the outlines of the initial glyph are transposed accordingly by the control points transposer 212. In some embodiments, the control points transposer 212 further generates a polynomial transposition for the modified control points.

In embodiments, the computation of the modified control points is based on which visual accessibility transformation(s) 204 is/are selected by the user, and optionally based on a degree of manipulation 206 selected for each visual accessibility transformation. Different visual accessibility transformations will dictate different manipulations to the initial glyph. Font manipulations particularly useful for improving the visual accessibility of text include, but are not limited to, glyph bottom part manipulations, glyph stem inclination modifications, glyph stem length modifications, glyph counter modifications, and similar modifications.

Figure 3A:
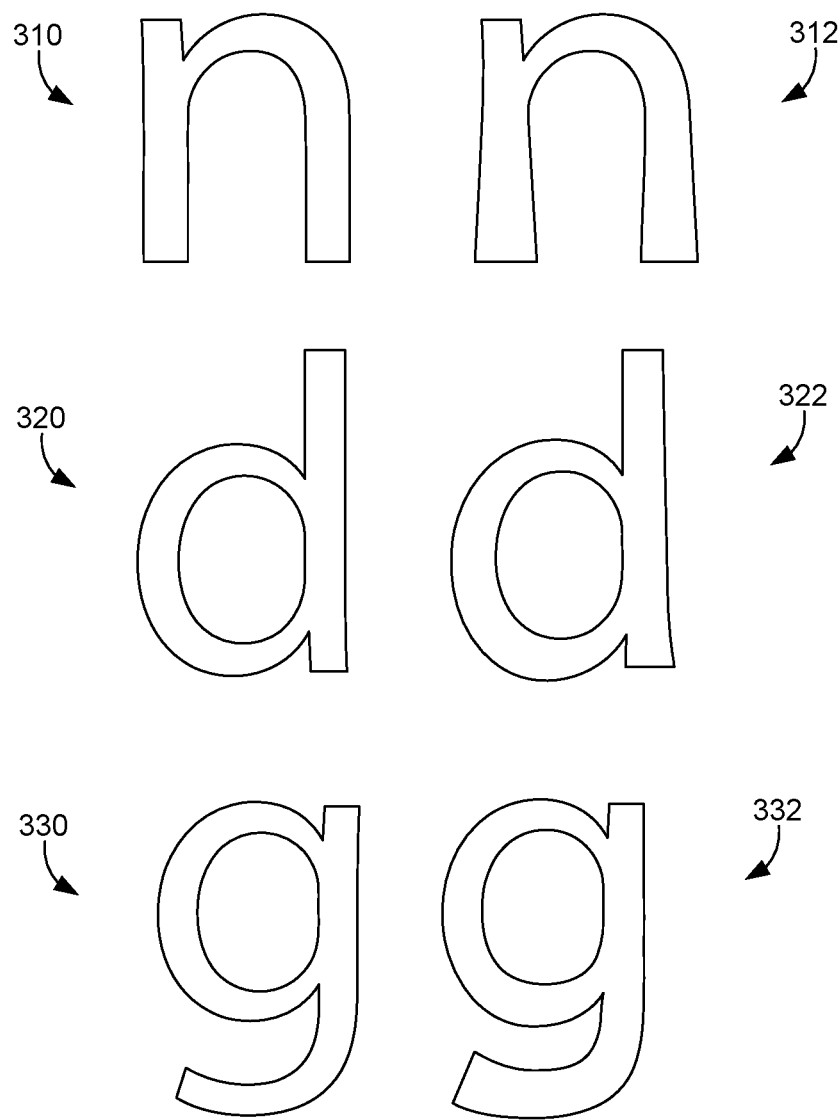
FIGS. 3A and 3B illustrate glyph bottom part visual accessibility font transformations generated by a dynamic glyph modification function in accordance with embodiments of the present disclosure.
Figure 3B:
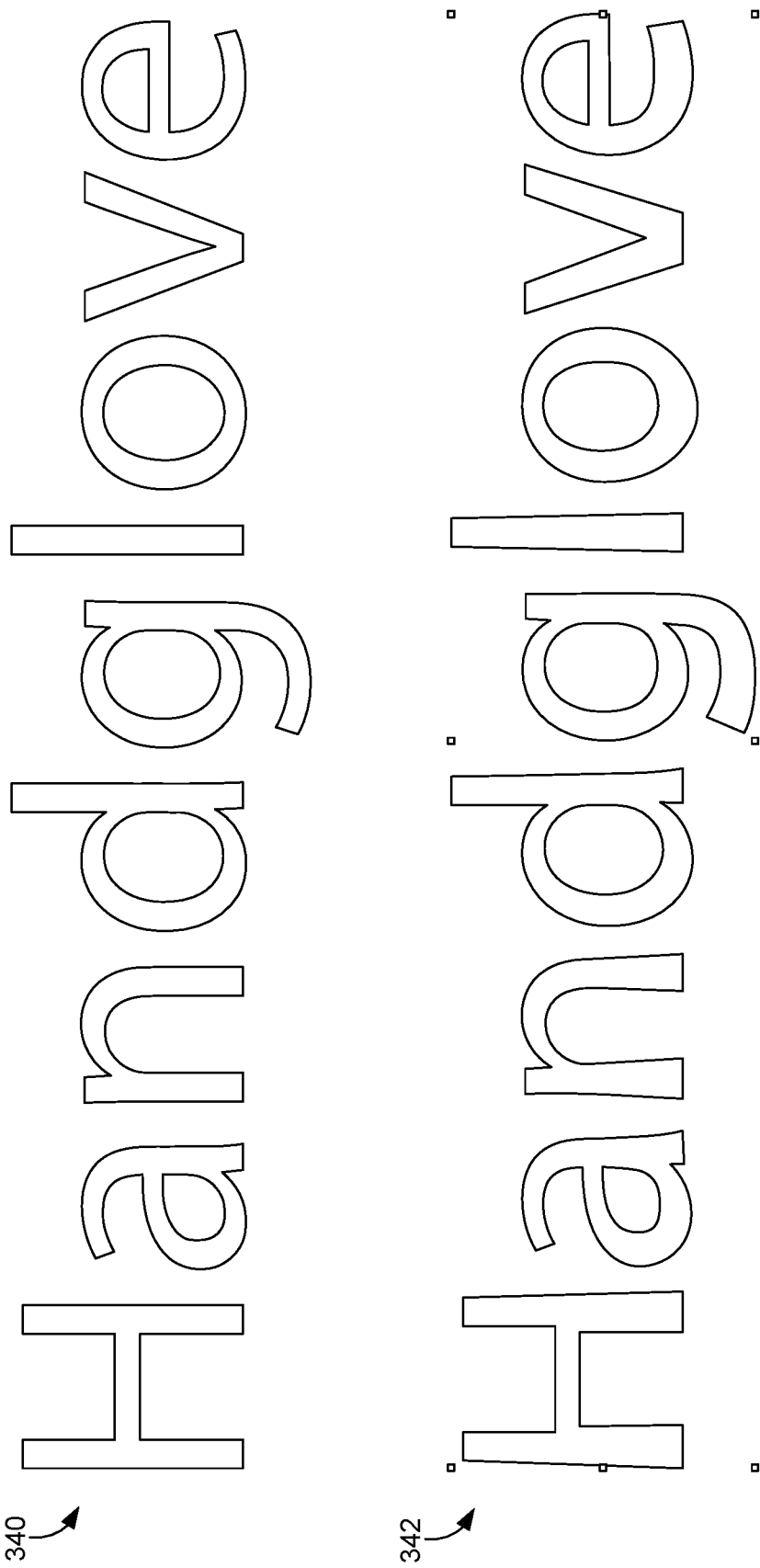

For example, with respect to glyph bottom part manipulations, glyphs that have heavy weighted bottoms are quite useful to indicate direction and gravity. This characteristic is visible in specially designed fonts such as OpenDyslexic. Visual accessibility of text is improved by bottom part manipulation as a user reading the text is able to quickly figure out which part of each glyph is down, which aids in recognizing the correct letter, and helps the user avoid incorrectly perceiving the glyph in a rotated orientation. Glyphs with consistently weighted bottoms can also help reinforce the line of text. Examples of glyph bottom part manipulation are illustrated in FIGS. 3A and 3B. In FIG. 3A, an initial glyph of the letter "n" for the Myriad Pro font is shown at 310, and the corresponding modified glyph comprising bottom manipulation is shown at 312. At 320, an initial glyph of the letter "d" for the Myriad Pro font is shown, and the corresponding modified glyph comprising bottom manipulation is shown at 322. At 330, an initial glyph of the letter "g" for the Myriad Pro font is shown, and the corresponding modified glyph comprising bottom manipulation is shown at 332. In FIG. 3B, the word "Handglove" is shown in Myriad Pro font at 340, and with bottom manipulation shown at 342.

In various embodiments, bottom manipulation is performed by the control points transposer 212 using configurable linear and/or polynomial transposition of control points for any given outline.

In some embodiment, the control points transposer 212 executes a configurable linear transposition strategy for control points. The control points transposer 212 computes the δx and δy which are used to perform the modification to the initial control points and perform a vector skeletonization over the outlines to find a medial axis curve for the glyph. Skeletonization is a process that generates a representation of an image by reducing foreground regions to a skeletal remnant that preserves the connectivity between regions of the original image.

In some embodiments, delta (δ) adjustments from an initial control point to a modified control point are separately computed in terms of δX and δY adjustments. Given a point M located at a center point of a bounding box for the initial glyph, a line equation from M to any initial control point P would be:

$$y = (P \cdot y - M \cdot y)/(P \cdot x - M \cdot x) * x$$

so for a given delta adjustment δ with $P_m$ representing a modified control point, $$(P_m \cdot x - P \cdot x)/\delta = (P_m \cdot x - M \cdot x)/\sqrt{(P_m \cdot y - M \cdot y)^2 + (P \cdot x - M \cdot x)^2}$$

The terms δX and δY can therefore be expressed as:

$$\delta X = |P \cdot x - M \cdot x| * \delta / \sqrt{(P \cdot y - M \cdot y)^2 + (P \cdot x - M \cdot x)^2}$$

$$\delta Y = \sqrt{\delta^2 - \delta X^2}$$

In some embodiment, the control points transposer 212 executes a configurable polynomial transposition strategy for control points. In such implementations, $P_m$ is expressed as:

$$P_m \cdot y = \sum_{k=0}^{n} a_k P_m \cdot x^k$$

so that $$\delta X = |P \cdot x - M \cdot x| * \delta \sqrt{(P \cdot y - M \cdot y)^2 + (P \cdot x - M \cdot x)^2}$$

as was the case for linear transposition, and the polynomial transposition delta for Y using the provided configurable coefficients is:

$$\delta Y = |P_m \cdot Y - P \cdot y|$$

In some embodiments, the selection between the control points transposer 212 using linear versus polynomial transposition is configurable via the application 110. Moreover, in some embodiments, polynomial coefficients, $a_k$, is user configurable via the application 110 and/or the application 110 provides default polynomial coefficients, $a_k$. In some embodiments, when the control point transposition module 210 receives a visual accessibility transformation selection 204 for polynomial transposition bottom modification, it determines (at 214) if one or more polynomial coefficients are associated with the selected visual accessibility transformation. For example, polynomial coefficients associated with a selected visual accessibility transformation can be provided by a transposer library 216 that includes coefficients, arguments, algorithms, and/or or other information related to selected visual accessibility transformations. If one or more polynomial coefficients are associated with the selected visual accessibility transformation, the coefficients are passed to the control points transposer 212. Receiving polynomial coefficients indicates to control points transposer 212 to perform polynomial transposition. In contrast, when the control point transposition module 210 receives no polynomial coefficients associated with the selected visual accessibility transformation, it proceeds with a linear transposition bottom modification. The absence of polynomial coefficients indicates to control points transposer 212 to perform a linear transposition. In some embodiments, the user provided degree of manipulation 206 is also passed to the control points transposer 212, essentially functioning as a gain control, for example to scale the value of computed δX and δY.

Once the δX and δY are computed, a modified control point ($X_m$ and $Y_m$) is computed relative to each initial control point ($X_i$ and $Y_i$) by a conciliator outline function 218 to generate an intermediary glyph (shown at 222). For example, from each initial control point, a modified control point can be computed from $X_m = X_i + \delta X$ and $Y_m = Y_i + \delta Y$. In some embodiments, the intermediary glyph generated by the conciliator outline function 218 comprises one or more glyph outlines produced by applying Bezier curve parametric equations to the modified control points.

While the structure of this intermediary glyph will include the desired visual accessibility attributes associated with the selected visual accessibility transformation(s), the glyph may have lost one or more distinctive characteristics of the typeface of the initial glyph. In order to preserve defining characteristics of the initial glyph while generating a modified glyph, curve fitting using a font metadata loss function derived from the initial and modified control points is applied (shown at 224) by the curve fitting module 220 to the intermediary glyph.

More specifically, dynamic glyph modification function 120 comprises a curve fitting module 220 that generates a font metadata loss function based on the set of initial control points and the set of modified control points, and constructs a modified glyph by curve fitting the intermediary glyph using Differential Evolution (DE) to minimize the font metadata loss function. DE is a popular heuristic optimization algorithm that computes multi-dimensional real-valued candidate solutions based on a continuous objective function, iteratively attempting to improve the candidate solutions. Candidate solutions yielding the best objective values are passed to the next iteration of the algorithm. When DE is utilize to converge on a minimum of the objective function, that function is referred to as a DE loss function (or cost function or error function).

With some embodiments presented herein, the DE loss function comprises a font metadata loss function that specifically applies to font glyph Bezier curves by taking glyph metadata parameters into account. The loss function output is minimized while curve fitting the modified control points of the intermediary glyph using DE to obtain a shape fitting curve that most closely preserves the shape and character of the initial glyph given the visual accessibility modification applied by the control point transposition module 210.

In some embodiments, the curve fitting module 220 computes the font metadata loss function as follows. For a given intermediary glyph, where the modified control points are $(x_{mi}, y_{mi})$ and the initial control points are $(x_{ci}, y_{ci})$, then a control polygon distance, $\epsilon_{dist}$, can be computed, for example, as:

$$\epsilon_{dist} = \sum_{k=0}^{n}(y_{mk}-y_{ck})^2+(x_{mk}-x_{ck})^2$$

A slope error, $\epsilon_{slope}$, representing a sum of squares error between the initial control points and the modified control point, can be computed as a sum of squares between their slope differences, for example, by:

$$\epsilon_{slope}=\sum_{k=0}^{n}\left(\frac{dy_{mk}}{dx_{mk}}-\frac{dy_{ck}}{dxy_{ck}}\right)^2$$

A glyph height normalized tolerance $xH_{nt}$ can be defined as a x-height normalized tolerance (i.e. the resulting δ in x-height for the modified glyph divided by a predefined maximum x-height δ) can be expressed, for example, by:

$$xH_{nt}=\delta x_{height}/\delta x_{heightMaxAllowed}$$

A glyph width normalized tolerance $xW_{nt}$ can be defined as a width normalized tolerance (i.e. the resulting δ in width for the modified glyph divided by a predefined maximum width δ) can be expressed, for example, by:

$$gW_{nt}=\delta glyph_{width}/\delta glyph_{widthMaxAllowed}$$

Based on these loss components, the curve fitting module 220 generates a font metadata loss function that can be expressed as:

$$f_{loss}=w_1*\epsilon_{dist}+w_2*\epsilon_{slope}+w_3*xH_{nt}+w_2*gW_{nt}$$

where $w_1$, $w_2$, $w_3$ and $w_4$ are predefined weight constants. In some embodiments, the predefined weight constants comprise default values programmed into the dynamic glyph modification function 120, or selected from transposer library 216, and/or computed, based on the selected visual accessibility transformation(s). In some embodiments, the default values can be customized by the user, for example via an advanced preferences interface of the application 110. Applying DE curve fitting to the modified control points to construct the modified glyph using the font metadata loss function ensures that the modified glyph's shape losses as compared to the initial glyph are minimal.

In some embodiments, further processing of the modified glyph can be applied by an outline post-processing module 230 to optionally apply smoothening and/or collision handling as needed. Smoothening regularizes any discontinuities (e.g. kinks) in the resulting outline curves of the modified glyph. Collision handling remedies unintended instances of intersection (collision) between one or more of the component outlines of the modified glyph, for example by checking distances between outlines and restoring spacing between the outlines.

Figure 4:
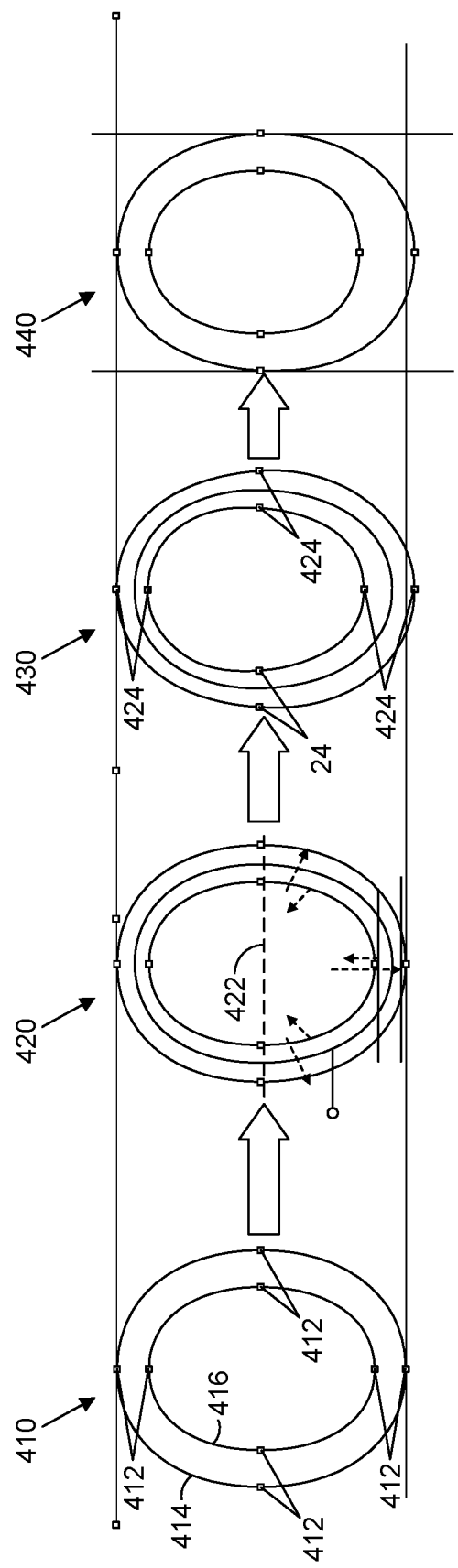
FIG. 4 illustrates a visual accessibility font transformation flow in accordance with embodiments of the present disclosure.

FIG. 4 illustrates an example application of bottom weight manipulation and DE curve fitting in accordance with one embodiment. In FIG. 4, original glyph outlines for a capital letter "O" is shown at 410 with initial control points at 412 for outlines 414 and 416. At 420, the control points transposer 212 has skeletonized the initial glyph 410 to identify the glyph's medial axis vector 422 and computed an δX and δY for each of the initial control points 412 to arrive at modified control points 424 shown at 430. The degree of manipulation is non-uniform where δX and δY have positive magnitudes below the medial axis (i.e., the glyph's bottom half) and the manipulation increases as a function of control point distance from the glyph center. At 430, an intermediary glyph constructed by the control points transposer 212 based on the modified control points 424 is shown. An optimal font metadata loss function is computed using the initial and modified control points. DE curve fitting is applied to the intermediary glyph using the font metadata loss function to arrive at the modified glyph for the capital letter "O" shown at 440. At this point smoothening and/or collision handling can be optionally applied to the modified glyph 440 as needed.

Figure 5A:
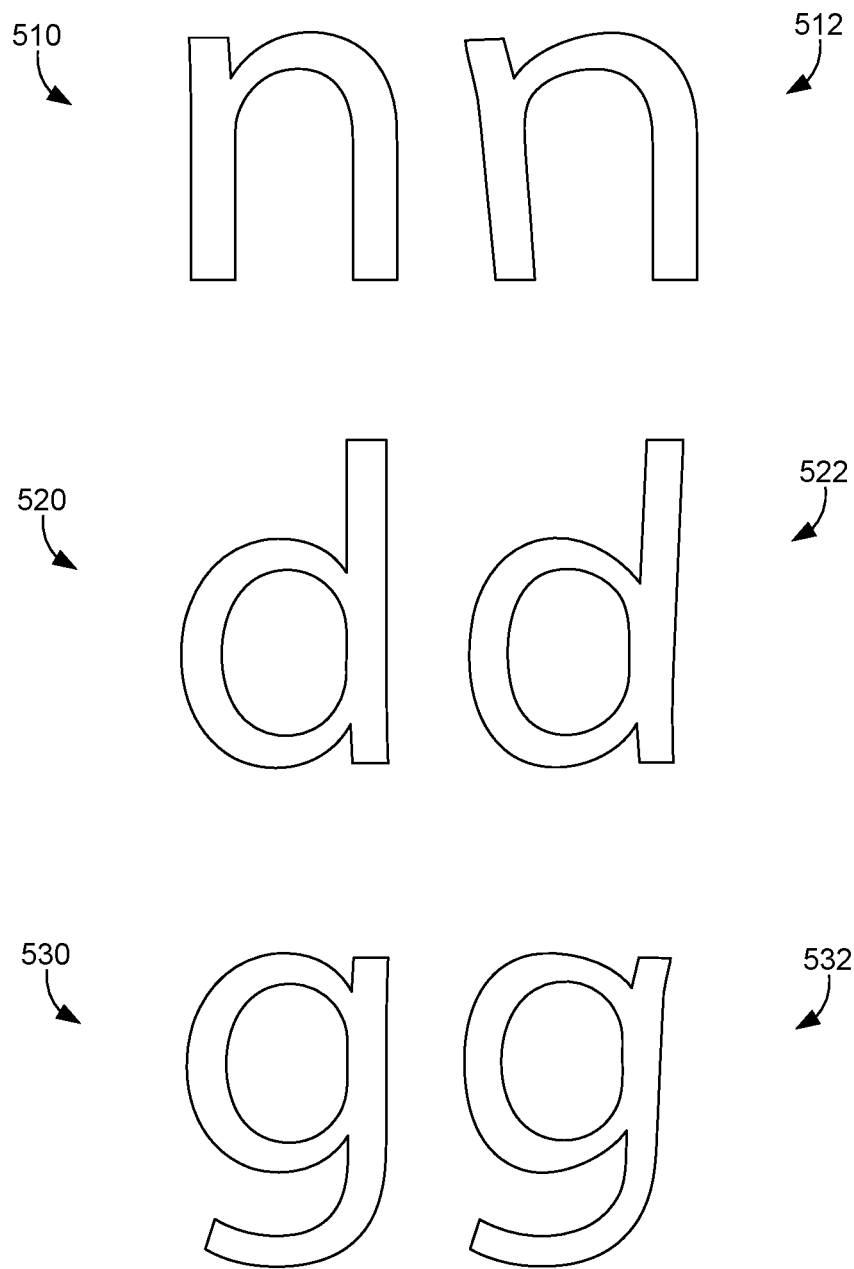
FIGS. 5A, 5B and 6 illustrate glyph stem inclination part visual accessibility font transformations generated by a dynamic glyph modification function in accordance with embodiments of the present disclosure.
Figure 5B:
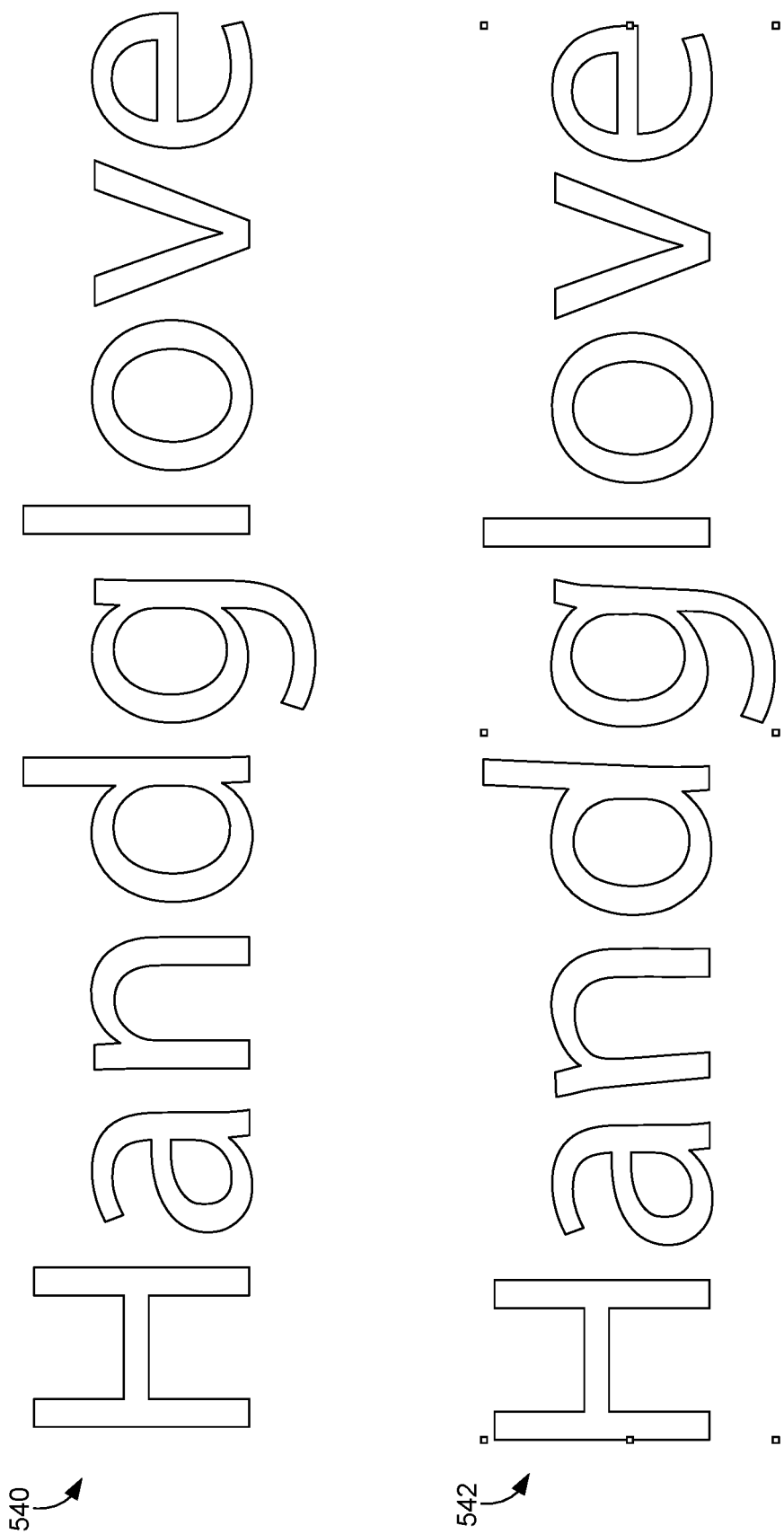

Glyph stem inclination is another example of a visual accessibility transformation that can be applied to an initial font by the dynamic glyph modification function 120. Adjusting inclination of glyphs helps in identifying characters such as letters and numbers apart from one other. Examples of glyph stem inclination manipulation are illustrated in FIGS. 5A and 5B. In FIG. 5A, an initial glyph of the letter "n" for the Myriad Pro font is shown at 510, and the corresponding modified glyph comprising stem inclination is shown at 512. At 520, an initial glyph of the letter "d" for the Myriad Pro font is shown, and the corresponding modified glyph comprising stem inclination is shown at 522. At 530, an initial glyph of the letter "g" for the Myriad Pro font is shown, and the corresponding modified glyph comprising stem inclination is shown at 532. In FIG. 5B, the word "Handglove" is shown in Myriad Pro font at 540, and with bottom manipulation shown at 542. These subtle inclinations help in the sense that the different letters are easier to distinguish.

Figure 6:
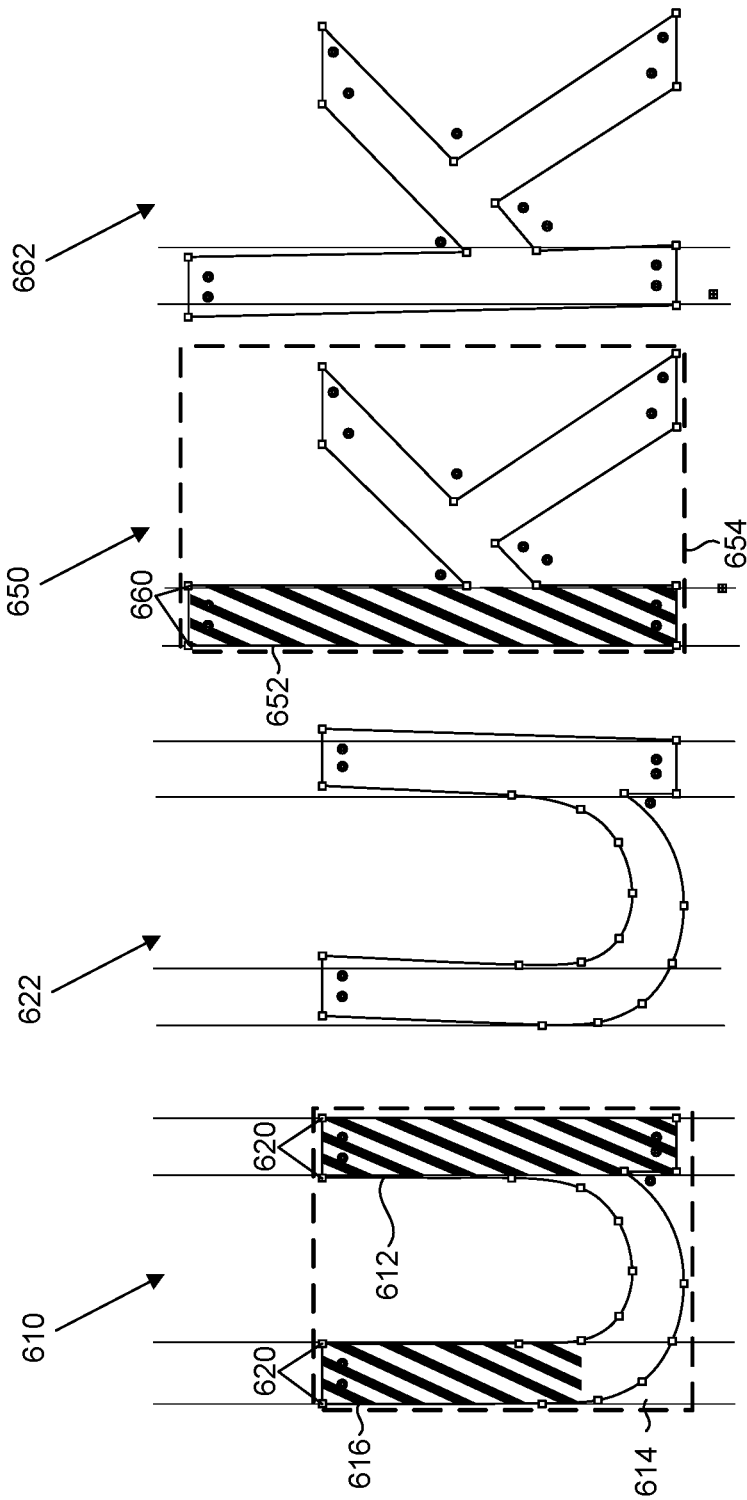

In some embodiments, glyph stem inclination modifications can be performed on an initial glyph by the control points transposer 212 through the adjustment of X coordinates of the initial control points. In other words, the control points transposer 212 computes a δX for initial control points controlling stems to obtain the desired degree of stem inclination in the modified glyph. In some embodiments, to execute a stem inclination visual accessibility transformation, the control points transposer 212 determines which vertical half of the initial glyph has more volume and adjusts inclination of the stems towards that direction. For example, in FIG. 6, stem inclination adjustments are illustrated for the lowercase letters "u" and "k". For the letter "u" shown at 610, the stem 612 in the right half of the bounding box 614 has greater volume than the stem 616 in the left half of the bounding box 614. The initial control points 620 at the top of stems 612 and 616 are shifted by a δX towards the right (i.e., in the direction of the half having the greater volume) to produce the modified glyph for the letter "u" shown at 622. For the letter "k" shown at 650, there is only a single stem (at 652) in the left half of the bounding box 654 with no counterbalancing stem on the right. The stem 652 in the left half therefore has greater volume than the non-existent stem in the right half of the bounding box 654. The initial control points 660 at the top of stem 652 is therefore shifted by δX towards the left (i.e., in the direction of the half having the greater volume) to produce the modified glyph for the letter "k" shown at 662. In some embodiments, for glyphs comprising symmetrical vertical stems, or no vertical stems, the control points transposer 212 performs no inclination adjustments.

Figure 7:
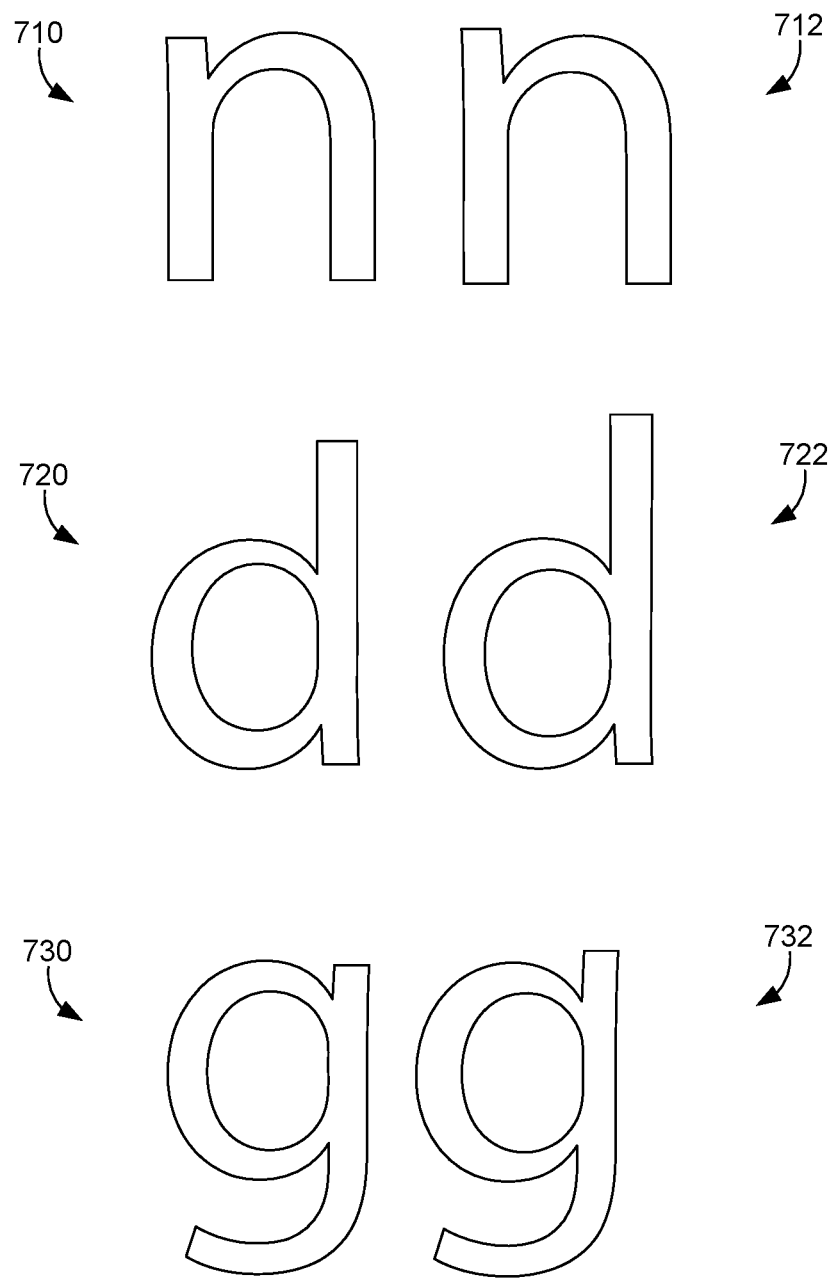
FIGS. 7 and 8 illustrates glyph stem length part visual accessibility font transformations generated by a dynamic glyph modification function in accordance with embodiments of the present disclosure.

Glyph stem length adjustments is yet another example of a visual accessibility transformation that can be applied to an initial font by the dynamic glyph modification function 120. Examples of glyph stem inclination manipulation are illustrated in FIG. 7. In FIG. 7, an initial glyph of the letter "n" for the Myriad Pro font is shown at 710, and the corresponding modified glyph comprising stem length adjustment is shown at 712. At 720, an initial glyph of the letter "d" for the Myriad Pro font is shown, and the corresponding modified glyph comprising stem length adjustment is shown at 722. At 730, an initial glyph of the letter "g" for the Myriad Pro font is shown, and the corresponding modified glyph comprising stem length adjustment is shown at 732. These subtle length variation of having longer sticks helps to decrease switching and swapping letters while reading.

Figure 8:
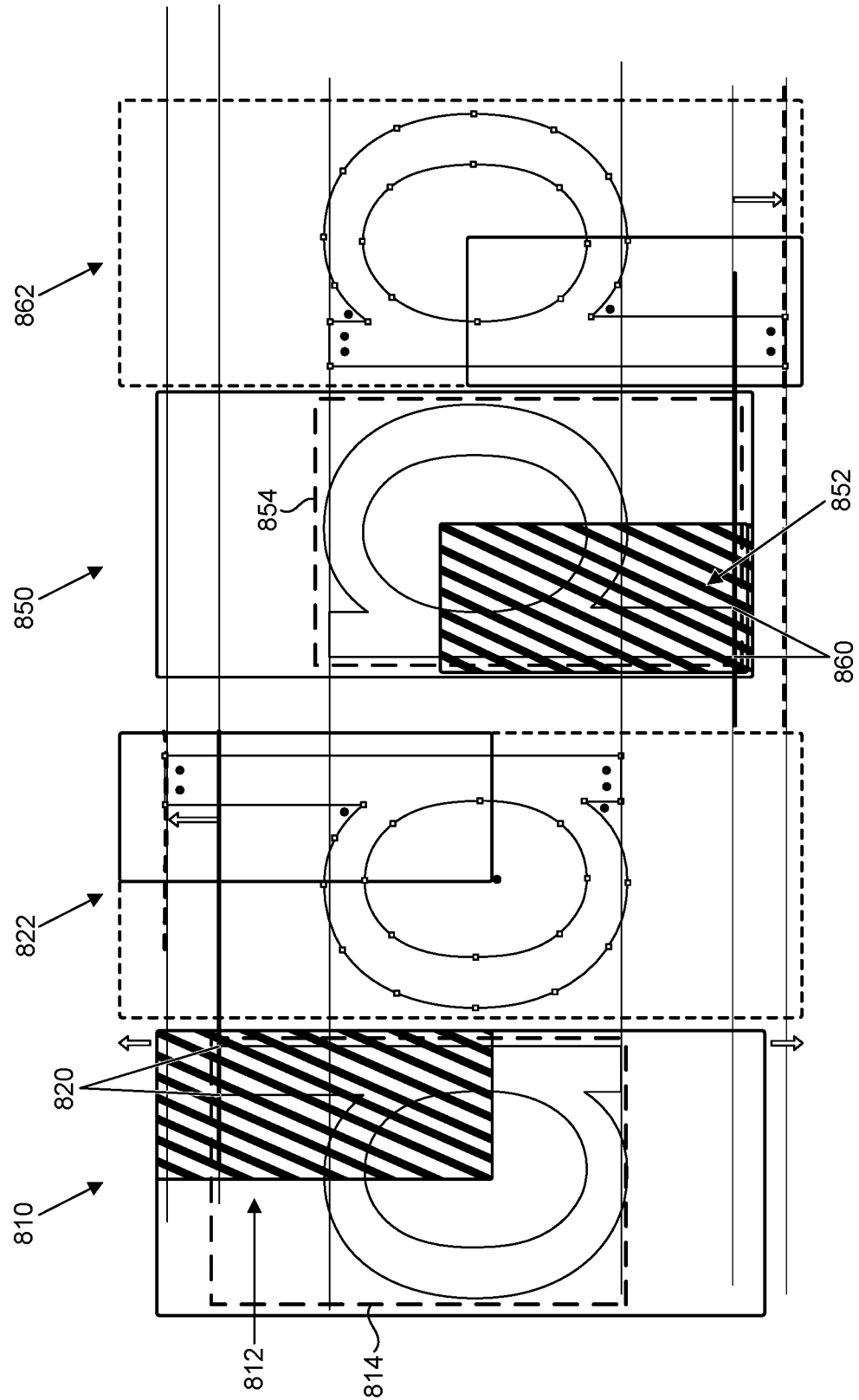

For example, in FIG. 8, stem length adjustments are illustrated for the lowercase letters "d" and "p". In some embodiments, glyph stem length modifications can be performed on an initial glyph by the control points transposer 212 through the adjustment of Y coordinates of the initial control points. In other words, the control points transposer 212 computes a δY for initial control points controlling stems to obtain the desired stem length adjustment in the modified glyph. In some embodiments, to execute a stem length visual accessibility transformation, the control points transposer 212 determines whether the dominant stem of the initial glyph comprises an ascender line or a descender line.

For example, in FIG. 8, stem length adjustments are illustrated for the lowercase letters "d" and "p". For the letter "d" shown at 810, the dominant stem 812 in the right half of the bounding box 814 is an ascender line. The initial control points 820 at the top of stem 812 are therefore shifted up by a δY to produce the modified glyph for the letter "d" shown at 822. For the letter "p" shown at 850, the dominant stem 852 in the left half of the bounding box 854 is descender line. The initial control points 860 at the bottom of stem 852 are therefore shifted down by a δY to produce the modified glyph for the letter "p" shown at 862.

For the glyph bottom part manipulations, glyph stem inclination manipulations, glyph stem length manipulations, or any other visual accessibility transformations, once the applicable δX and δY are computed by the control point transposition module 210, intermediary glyphs are constructed by computing a set of conciliator outlines based on the set of modified control points, a font metadata loss function based at least on the set of initial control points and the set of modified control points is generated, and curve fitting module 220 constructs a modified glyph by curve fitting the intermediary glyph using DE to minimize the font metadata loss function, in the same manner as described above for bottom manipulation. Likewise, in some embodiments post processing module 230 can optionally apply smoothening and/or collision handling to the modified glyph (shown at 232).

Figure 9A:
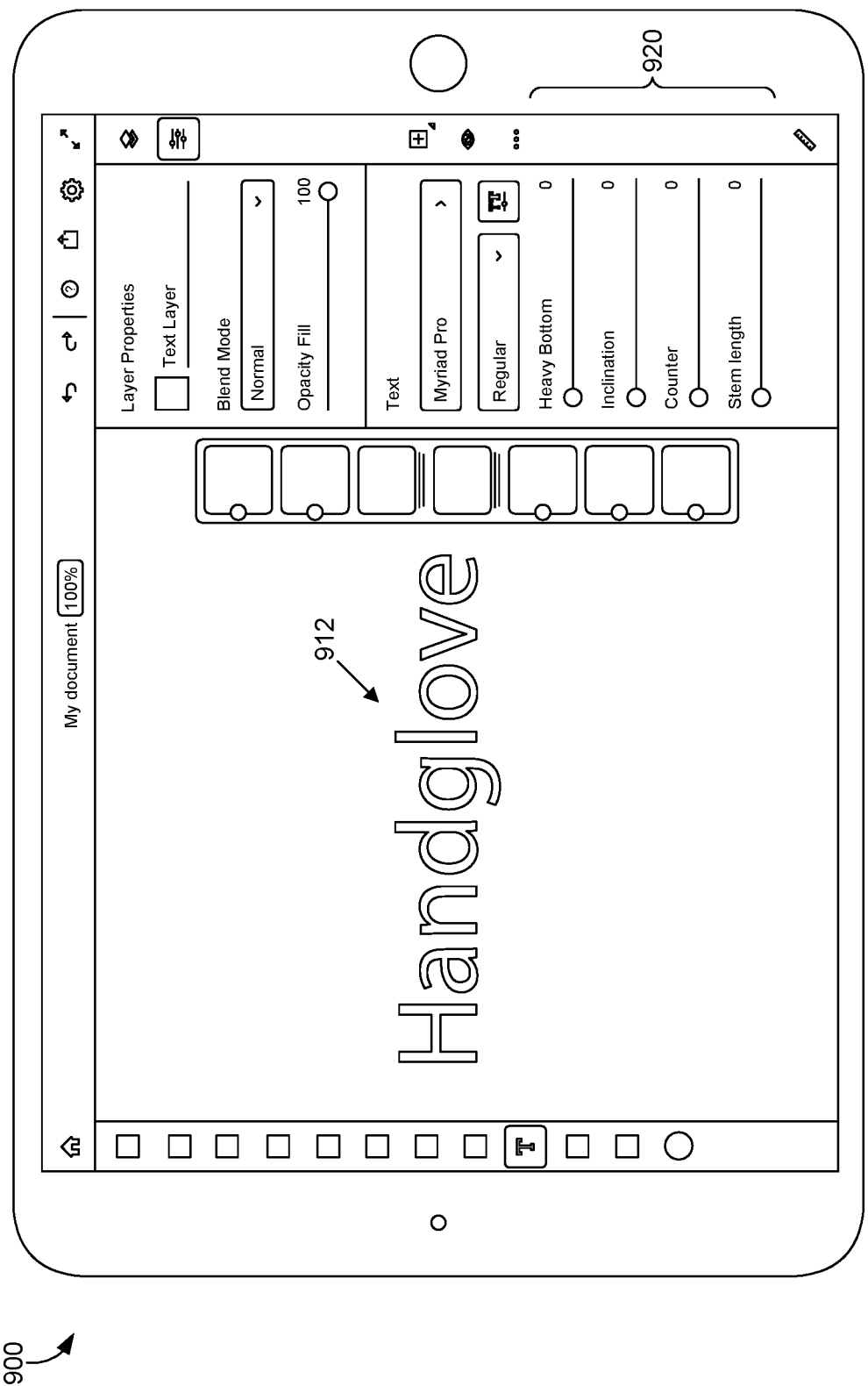
FIGS. 9A and 9B illustrate example user interfaces in accordance with embodiments of the present disclosure.

FIG. 9A is a diagram illustrating an example user interface 900 generated by the application 110 on a human machine interface (HMI) display of the user device 102. The user interface 900 presents text 912 displayed using vector-based fonts from a document opened by, or served to, application 110. Here, the text "Handglove" 912 is displayed using the initial glyphs of the vector-based fonts specified by a document opened by application 110. At 920 the user interface 900 include one or more visual accessibility transformation controls through which the user of device 102 can interact with to select a visual accessibility transformation to apply to the text 912 and indicate a degree of manipulation to be applied using the selected visual accessibility transformation. In this example, the visual accessibility transformation controls are in the form of sliders that the user can move left to right. In order embodiments, other user interface control formats can be used. In this example, a visual accessibility transformation is selected from the visual accessibility transformation controls 920 by selecting a non-zero degree of manipulation for that visual accessibility transformation. In this example, visual accessibility transformation controls 920 are presented for heavy bottom, stem inclination, stem length, and glyph counter, with each of the control sliders set to zero meaning that no visual accessibility transformations are applied and the text 912 is being presented unmodified.

Figure 9B:
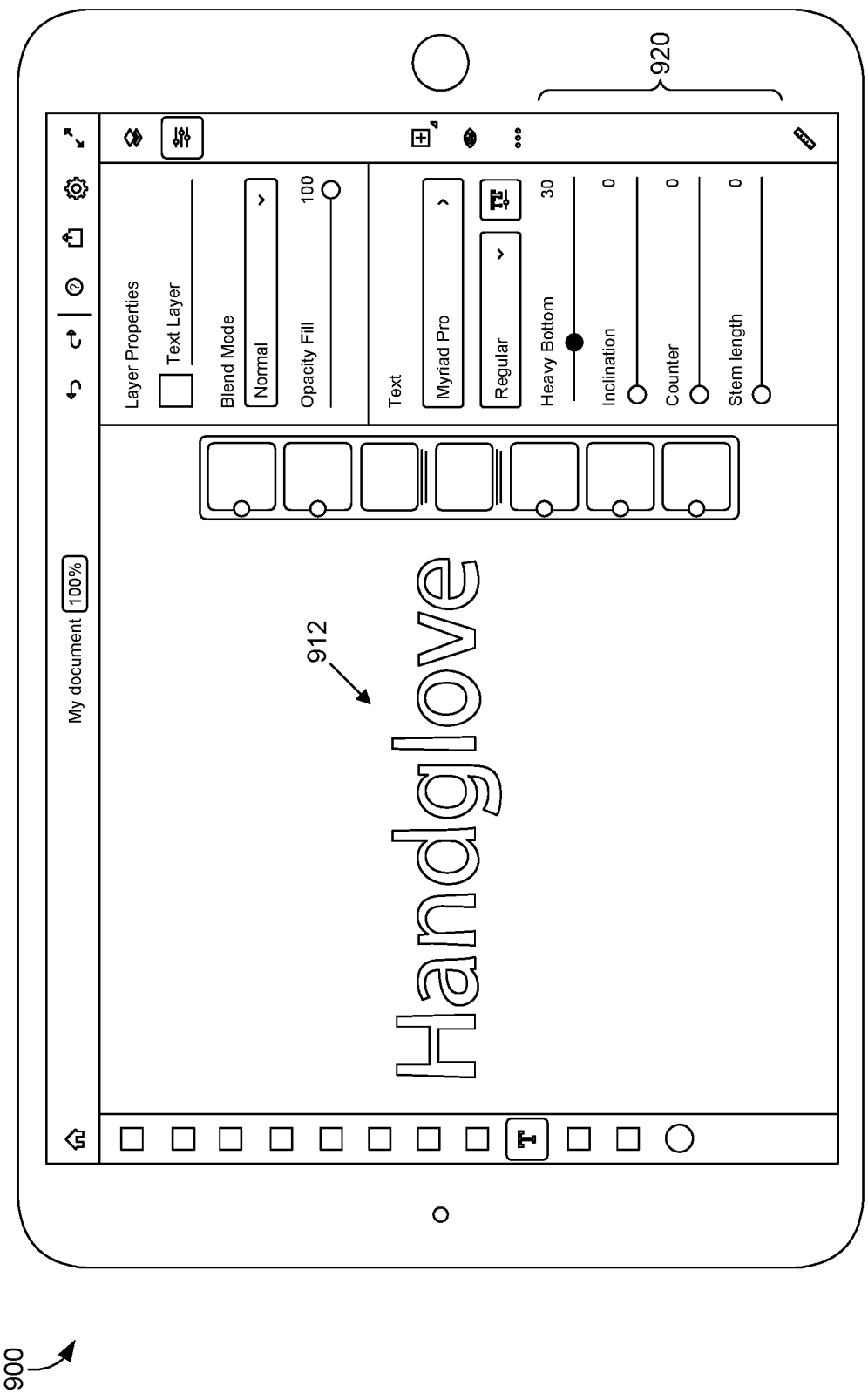

Referring to FIG. 9B, the visual accessibility transformation control 920 for heavy bottom is set to a non-zero value (30 in this example). Based on the setting of that visual accessibility transformation control 920, the dynamic glyph modification function 120 will apply the selected visual accessibility transformation to the text (in this case, the heavy bottom transformation) to the degree of manipulation indicated by the value of the visual accessibility transformation control 920 setting. The text 912 is accordingly presented using the modified glyphs generated by the dynamic glyph modification function 120.

In some embodiments, when more than one visual accessibility transformation is selected via the visual accessibility transformation controls 920, the control point transposition module 210 will compute δX and δY for modified control points based on the combination of selected visual accessibility transformations, and curve fitting module 220 constructs a modified glyph by curve fitting the intermediary glyph using DE to minimize the font metadata loss function, in the same manner as described above for instances where a single visual accessibility transformation is selected. Likewise, in some embodiments post processing module 230 can optionally apply smoothening and/or collision handling to the modified glyph.

In some embodiments, the application can save settings for the visual accessibility transformation controls 920 as embedded metadata with the document, so that each time the document is opened by the application, those settings are reapplied to produce modified glyphs. In some embodiments, the selected settings for the visual accessibility transformation controls 920 can be saved by the application 110 as a global preference setting and applied to any documents opened by, or served to, the application 110.

Figure 10A:
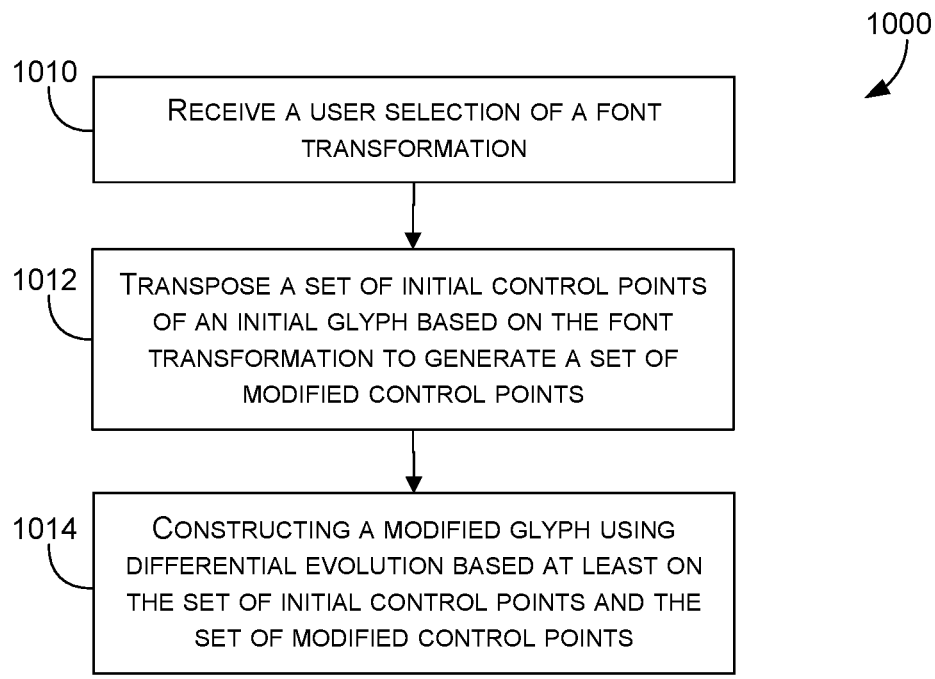
FIGS. 10A and 10B are flow charts illustrating example method embodiments for dynamic glyph modification in accordance with embodiments of the present disclosure.
Figure 10B:
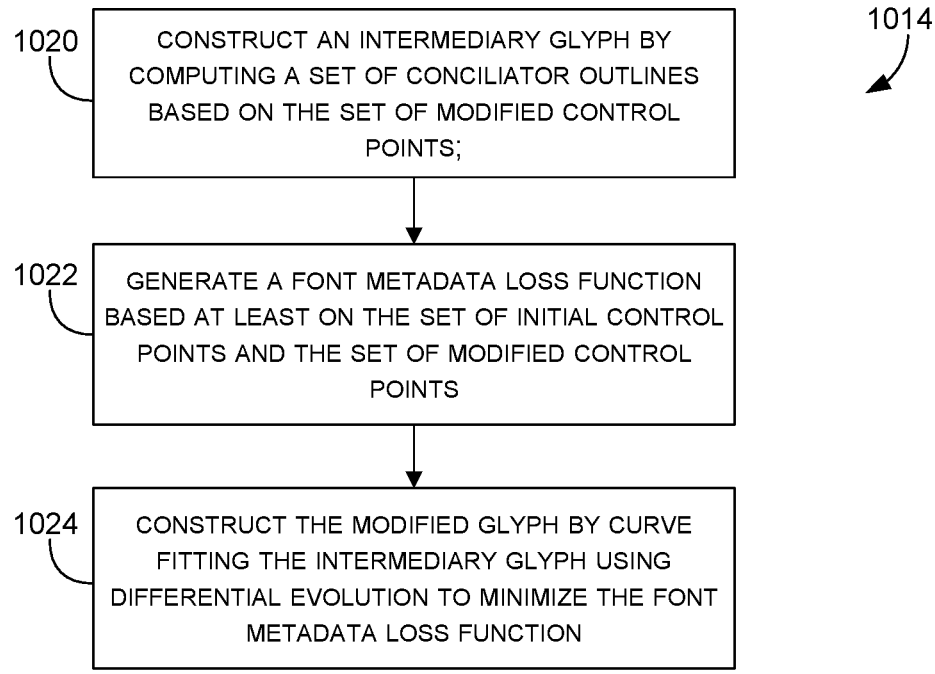

To illustrate an example process implemented by the environment 100, FIGS. 10A and 10B are flow charts illustrating a method 1000 for implementing a dynamic glyph modification function. It should be understood that the features and elements described herein with respect to the method 1000 of FIGS. 10A and 10B can be used in conjunction with, in combination with, or substituted for elements of, any of the other embodiments discussed herein and vice versa. Further, it should be understood that the functions, structures, and other descriptions of elements for embodiments described in FIGS. 10A and 10B can apply to like or similarly named or described elements across any of the figures and/or embodiments described herein and vice versa. In some embodiments, elements of method 1000 are implemented utilizing the application 110 and dynamic glyph modification function 120 disclosed above, or other processing device implementing the present disclosure.

Method 1000 begins at 1010 with receiving a user selection of a font transformation. In some embodiments, an application executed by a processor receives a document comprising a typeface that includes a plurality of glyphs. The document comprising the glyphs can be retrieved from a memory of the user device or a data store, or can be served to the application, for example by a web page server. The glyphs comprise vector-based fonts, such as but not limited to Adobe® Type 1, OpenType, TrueType, or other font technology that uses lines and curves to define the boundary of glyphs. The application can receive from a user a selection of one or more visual accessibility font transformations and apply that font transformation to the native fonts of the document to impart visual accessibility attributes on the glyphs of the native font Method 1000 at 1012 includes transposing a set of initial control points of an initial glyph based on the font transformation to generate a set of modified control points. In some embodiments, a dynamic glyph modification function of the application generates a modified glyph for each glyphs of the native font that is modified based on the visual accessibility transformation(s) selected by the user. More specifically, the dynamic glyph modification function transposes the control point of the initial glyph based on the user selected visual accessibility font transformation(s) to generate a set of modified control points. In some embodiments, the dynamic glyph modification function receives a user provided degree of manipulation it uses to determine how much of a the transformation is applied to each initial control point to compute a modified control point.

Method 1000 at 1014 includes constructing a modified glyph using differential evolution based at least on the set of initial control points and the set of modified control points. Referring now to FIG. 10B, FIG. 10B illustrates an example process further defining constructing a modified glyph at 1014, in accordance with some embodiments. At 1020 the method includes constructing an intermediary glyph by computing a set of conciliator outlines based on the set of modified control points. As discussed above, constructing the modified glyph can comprise constructing an intermediary glyph by computing a set of conciliator outlines based on the set of modified control points. The set of conciliator outlines, in some embodiments, comprise glyph outlines produced by applying Bezier curve parametric equations to the modified control points. While the structure of the intermediary glyph will include the desired visual accessibility attributes associated with the selected visual accessibility font transformation(s), it may have lost one or more distinctive characteristics of the typeface of the initial glyph.

In order to preserve defining characteristics of the initial glyph in the modified glyph, the method applies a curve fitting based on an optimal loss function derived in part from the original control points is applied to the intermediary glyph. Accordingly, at 1022 the method includes generating a font metadata loss function based at least in part on the set of initial control points and the set of modified control points. In some embodiments, the font metadata loss function comprises a function of weighted elements including one or more of: a control polygon distance computed from the set of initial control points and the set of modified control points, a slope error computed from the set of initial control points and the set of modified control points, a glyph height normalized tolerance, and a glyph width normalized tolerance. At 1024 the method proceeds with constructing the modified glyph by curve fitting the intermediary glyph using differential evolution (DE) to minimize the font metadata loss function.

The method can then proceed with causing presentation of the document on a display device, wherein a respective modified glyph is displayed in place of each of the plurality of glyphs. In some embodiments, further post-processing of the modified glyph can be applied by the application to optionally apply smoothening and/or collision handling. The modified glyph is saved to a cache and associated with the initial glyph so that for each instance where the document includes the initial glyph, the application will display the modified glyph in in place of the initial glyph. In some embodiments, a set of modified glyphs is cached as a modified glyph array comprising each of the modified glyphs computed by the application. Visual accessibility attributes selected by the user can be embedded as metadata into the document, or stored as global application preferences.

Figure 11:
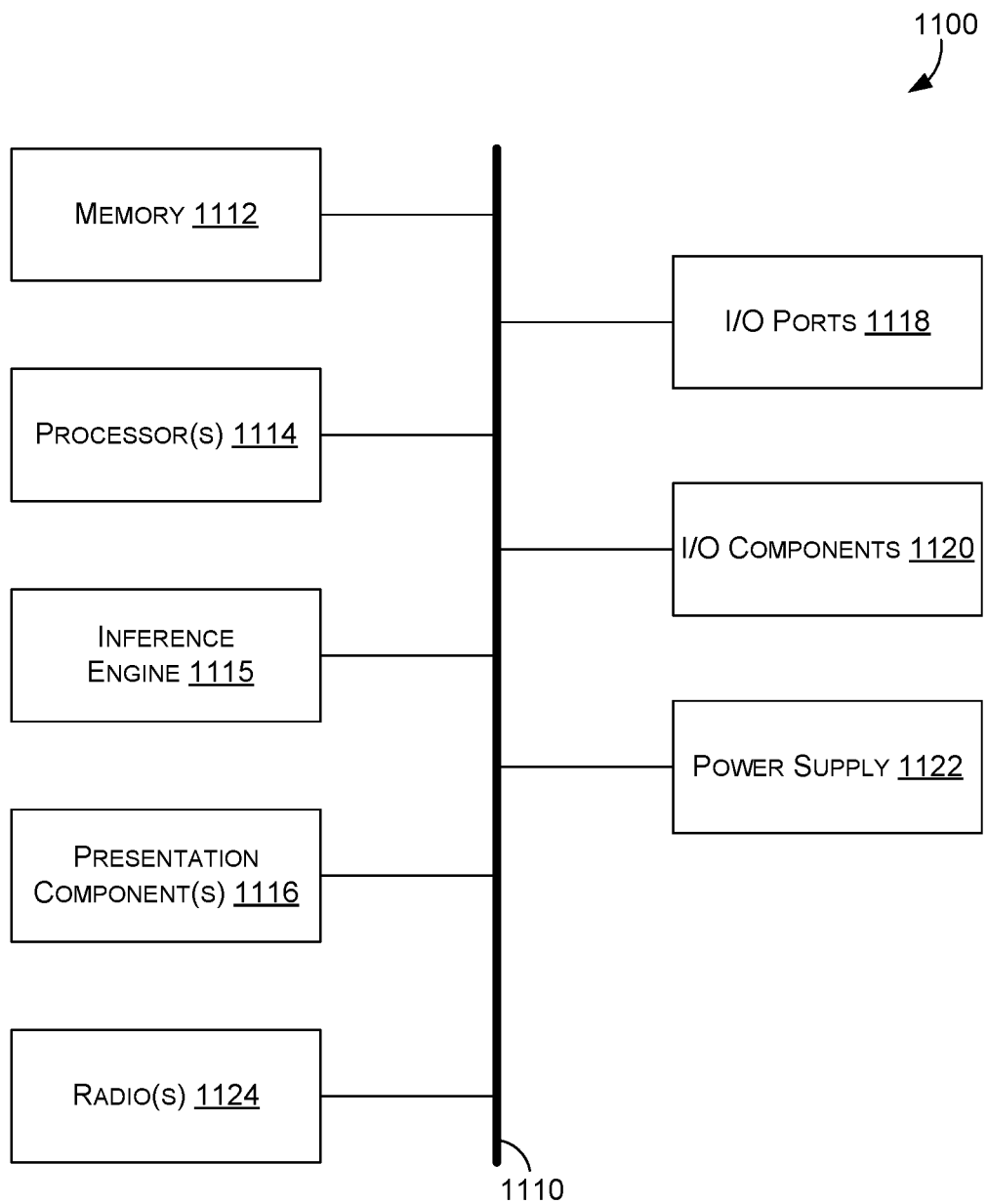
FIG. 11 is a diagram illustrating an example computing environment in accordance with embodiments of the present disclosure.
Figure 12:
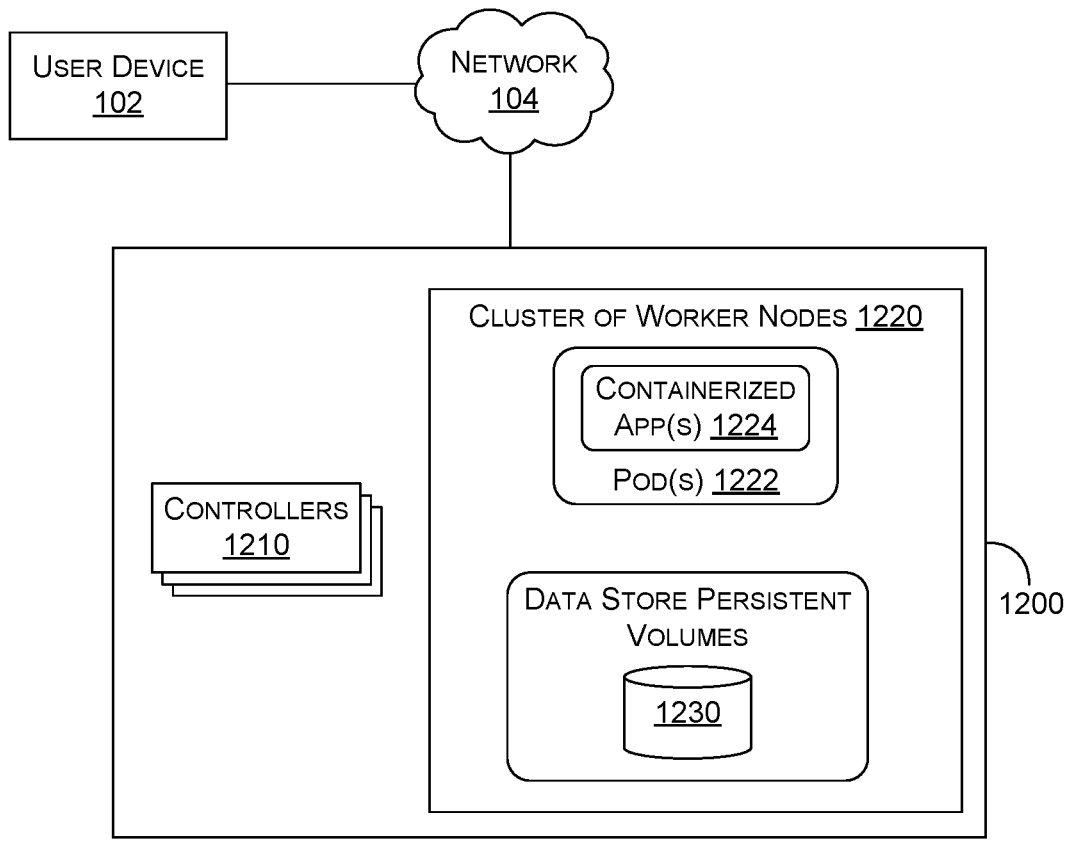
FIG. 12 is a diagram illustrating an example cloud based computing environment in accordance with embodiments of the present disclosure.

With regard to FIG. 11, one exemplary operating environment for implementing aspects of the technology described herein is shown and designated generally as computing device 1100. Computing device 1100 is just one example of a suitable computing environment and is not intended to suggest any limitation as to the scope of use or functionality of the technology described herein. Neither should the computing device 1100 be interpreted as having any dependency or requirement relating to any one or combination of components illustrated.

The technology described herein can be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein can be practiced in a variety of system configurations, including handheld devices, consumer electronics, general-purpose computers, and specialty computing devices. Aspects of the technology described herein can also be practiced in distributed computing environments where tasks are performed by remote-processing devices that are linked through a communications network.

With continued reference to FIG. 11, computing device 1100 includes a bus 1110 that directly or indirectly couples the following devices: memory 1112, one or more processors 1114, a neural network inference engine 1115, one or more presentation components 1116, input/output (I/O) ports 1118, I/O components 1120, an illustrative power supply 1122, and a radio(s) 1124. Bus 1110 represents one or more busses (such as an address bus, data bus, or combination thereof). Although the various blocks of FIG. 11 are shown with lines for the sake of clarity, it should be understood that one or more of the functions of the components can be distributed between components. For example, a presentation component 1116 such as a display device can also be considered an I/O component 1120. The diagram of FIG. 11 is merely illustrative of an exemplary computing device that can be used in connection with one or more aspects of the technology described herein. Distinction is not made between such categories as "workstation," "server," "laptop," "tablet," "smart phone" or "handheld device," as all are contemplated within the scope of FIG. 11 and refer to "computer" or "computing device."

Memory 1112 includes non-transient computer storage media in the form of volatile and/or nonvolatile memory. The memory 1112 can be removable, non-removable, or a combination thereof. Exemplary memory includes solid-state memory, hard drives, and optical-disc drives. Computing device 1100 includes one or more processors 1114 that read data from various entities such as bus 1110, memory 1112, or I/O components 1120. In some embodiments, one or both of application(s) 110 and dynamic glyph modification function 120 are implemented at least in part by the processors 1114.

Presentation component(s) 1116 present data indications to a user or other device and in some embodiments, comprises an HMI display used by application 110 to display documents as described herein. Neural network inference engine 1115 comprises a neural network coprocessor, such as but not limited to a graphics processing unit (GPU), configured to execute a deep neural network (DNN) and/or machine learning models. Exemplary presentation components 1116 include a display device, speaker, printing component, and vibrating component. I/O port(s) 1118 allow computing device 1100 to be logically coupled to other devices including I/O components 1120, some of which can be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which can include, by way of example only, a pen or a stylus) are provided in order to digitally capture freehand user input. The connection between the pen digitizer and processor(s) 1114 can be direct or via a coupling utilizing a serial port, parallel port, and/or other interface and/or system bus known in the art. Furthermore, the digitizer input component can be a component separated from an output component such as a display device, or in some aspects, the usable input area of a digitizer can be coextensive with the display area of a display device, integrated with the display device, or can exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs can be interpreted as ink strokes for presentation in association with the computing device 1100. These requests can be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100, in some embodiments, is be equipped with depth cameras, such as stereoscopic camera systems, infrared camera systems, RGB camera systems, and combinations of these, for gesture detection and recognition. Additionally, the computing device 1100, in some embodiments, is equipped with accelerometers or gyroscopes that enable detection of motion. The output of the accelerometers or gyroscopes can be provided to the display of the computing device 1100 to render immersive augmented reality or virtual reality. A computing device, in some embodiments, includes radio(s) 1124. The radio 1124 transmits and receives radio communications. The computing device can be a wireless terminal adapted to receive communications and media over various wireless networks.

FIG. 11 is a diagram illustrating a cloud based computing environment 1200 for implementing one or more aspects of the application 110 and/or dynamic glyph modification function 120 discussed with respect to any of the embodiments discussed herein. Cloud based computing environment 1200 comprises one or more controllers 1210 that each comprises one or more processors and memory, each programmed to execute code to implement at least part of the dynamic glyph modification function 120. In one embodiment, the one or more controllers 1210 comprise server components of a data center. The controllers 1210 are configured to establish a cloud base computing platform executing the dynamic glyph modification function 120. For example, in one embodiment the application 110 and/or the dynamic glyph modification function 120 are virtualized network services running on a cluster of worker nodes 1220 established on the controllers 1210. For example, the cluster of worker nodes 1220 can include one or more of Kubernetes (K8s) pods 1222 orchestrated onto the worker nodes 1220 to realize one or more containerized applications 1224 for the application 110 and/or the dynamic glyph modification function 120. In some embodiments, the user device 102 can be coupled to the controllers 1210 by network 104 (for example, a public network such as the Internet, a proprietary network, or a combination thereof). In such and embodiment, one or both of the application 110 and/or the dynamic glyph modification function 120 are at least partially implemented by the containerized applications 1224. In some embodiments the cluster of worker nodes 1220 includes one or more one or more data store persistent volumes 1230 that implement the data store 106.

In various alternative embodiments, system and/or device elements, method steps, or example implementations described throughout this disclosure (such as the application, dynamic glyph modification function, control points transposition module, curve fitting module, outline post-processing module, or any of the modules or sub-parts of any thereof, for example) can be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure can include elements comprising program instructions resident on computer readable media which when implemented by such computer systems, enable them to implement the embodiments described herein. As used herein, the terms "computer readable media" and "computer storage media" refer to tangible memory storage devices having non-transient physical forms and includes both volatile and nonvolatile, removable and non-removable media. Such non-transient physical forms can include computer memory devices, such as but not limited to: punch cards, magnetic disk or tape, or other magnetic storage devices, any optical data storage system, flash read only memory (ROM), non-volatile ROM, programmable ROM (PROM), erasable-programmable ROM (E-PROM), Electrically erasable programmable ROM (EEPROM), random access memory (RAM), CD-ROM, digital versatile disks (DVD), or any other form of permanent, semi-permanent, or temporary memory storage system of device having a physical, tangible form. By way of example, and not limitation, computer-readable media can comprise computer storage media and communication media. Computer storage media does not comprise a propagated data signal. Program instructions include, but are not limited to, computer executable instructions executed by computer system processors and hardware description languages such as Very High Speed Integrated Circuit (VHSIC) Hardware Description Language (VHDL).

In the above detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments can be utilized and that logical, mechanical and electrical changes can be made without departing from the scope of the present disclosure. The detailed description is, therefore, not to be taken in a limiting sense. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and can be employed without reference to other features and sub-combinations and are contemplated within the scope of the claims.

What is claimed is:

1. A system comprising:
   a memory component; and
   one or more processing devices coupled to the memory component, the one or more processing device to perform operations comprising:
   receiving a user selection of a font transformation;
   transposing a set of initial control points of an initial glyph based on computing a function of one or more coefficients or helper arguments based on the user selection of the font transformation to generate a set of modified control points; and
   constructing a modified glyph using differential evolution based at least on the set of initial control points and the set of modified control points.

2. The system of claim 1, the operations further comprising:
   constructing an intermediary glyph by computing a set of conciliator outlines based on the set of modified control points;
   generating a font metadata loss function based at least on the set of initial control points and the set of modified control points; and
   constructing the modified glyph by curve fitting the intermediary glyph using differential evolution to minimize the font metadata loss function.

3. The system of claim 2, wherein the font metadata loss function comprises a function of:
   a control polygon distance computed from the set of initial control points and the set of modified control points;
   a slope error computed from the set of initial control points and the set of modified control points;
   a glyph height normalized tolerance; and
   a glyph width normalized tolerance.

4. The system of claim 1, the operations further comprising:
   applying one or both of a smoothening function and a collision handling function to the modified glyph.

5. The system of claim 1, the operations further comprising:
   receiving a user selection of a degree of manipulation for the font transformation, wherein the set of modified control points is based at least in part on a function of the degree of manipulation.

6. The system of claim 1, the memory component comprising a font transposer library, wherein the user selection of the font transformation comprises a selection from a plurality of font transformations from the font transposer library.

7. The system of claim 1, wherein the user selection of the font transformation comprises the selection of a first font transformation and a second font transformation, wherein the set of modified control points is generated based on the first font transformation and the second font transformation.

8. The system of claim 7, wherein the set of modified control points is generated based on a user selection of a degree of manipulation for the first font transformation and a user selection of a degree of manipulation for the second font transformation.

9. The system of claim 1, the operations further comprising:
   receiving a document file comprising a typeface that includes the initial glyph;
   receiving a user selection of a degree of manipulation for the font transformation, wherein the set of modified control points is based at least in part on a function of the degree of manipulation; and saving the user selection of a degree of manipulation for the font transformation in the document file.

10. The system of claim 1, the operations further comprising:

causing display of a document comprising one or more instances of the initial glyph on a display device, wherein the modified glyph is displayed in place of the one or more instances of the initial glyph.

11. The system of claim 1, wherein the font transformation comprises at least one of:

a bottom part manipulation;
a glyph stem inclination modification;
a glyph stem length modification; and
a glyph counter modification.

12. A method comprising:

receiving, by an application executed by a processor, a document comprising a typeface that includes a plurality of glyphs;

receiving, by the application, a user selection of a degree of manipulation for a font transformation;

for each of the plurality of glyphs, with the processor:
transposing a set of initial control points based on the font transformation to generate a set of modified control points, wherein the set of modified control points is based at least in part on the function of the degree of manipulation;

constructing a modified glyph using differential evolution based at least on the set of initial control points and the set of modified control points; and causing presentation of the document on a display device, wherein a respective modified glyph is displayed in place of each of the plurality of glyphs; and saving the user selection of the degree of manipulation for the font transformation in the document.

13. The method of claim 12, further comprising:

constructing an intermediary glyph by computing a set of conciliator outlines based on the set of modified control points;

generating a font metadata loss function based at least on the set of initial control points and the set of modified control points; and constructing the modified glyph by curve fitting the intermediary glyph using differential evolution to minimize the font metadata loss function.

14. The method of claim 13, wherein the font metadata loss function comprises a function of:

a control polygon distance computed from the set of initial control points and the set of modified control points;

a slope error computed from the set of initial control points and the set of modified control points;

a glyph height normalized tolerance; and a glyph width normalized tolerance.

15. The method of claim 12, further comprising:

causing presentation of at least one font transformation user control on the display device, wherein the user selection of the degree of manipulation is based on a user interaction with the at least one font transformation user control.

16. The method of claim 12, further comprising:

computing one or more coefficients or helper arguments based at least in part on the user selection of the degree of manipulation for the font transformation;

wherein the set of modified control points is based at least in part on a function of the degree of manipulation.

17. A non-transitory computer-readable medium storing executable instructions, which when executed by a processing device, cause the processing device to perform operations comprising:

transposing a set of initial control points of an initial glyph based on computing a function of one or more coefficients or helper arguments based on a user selection of a font transformation, to generate a set of modified control points;

constructing a modified glyph using differential evolution based at least on the set of initial control points and the set of modified control points; and caching the modified glyph in a modified glyph array associated with the initial glyph.

18. The non-transitory computer-readable medium of claim 17, the operations further comprising:

causing display of a document comprising the plurality of glyphs on a display device, wherein a respective modified glyph from the modified glyph array is displayed in place of an associated initial glyph of the plurality of glyphs.

19. The non-transitory computer-readable medium of claim 17, the operations further comprising:

constructing an intermediary glyph by computing a set of conciliator outlines based on the set of modified control points;

generating a font metadata loss function based at least on the set of initial control points and the set of modified control points; and constructing the modified glyph by curve fitting the intermediary glyph using differential evolution to minimize the font metadata loss function.

* * * * *